US008775475B2

(12) United States Patent
Patil et al.

(10) Patent No.: US 8,775,475 B2
(45) Date of Patent: Jul. 8, 2014

(54) TRANSACTION DATA REPRESENTATIONS USING AN ADJACENCY MATRIX

(75) Inventors: Dhanurjay A. S. Patil, Belmont, CA (US); Grahame Andrew Jastrebski, San Jose, CA (US); Allison E. Miller, Mountain View, CA (US); Chris Riccomini, Saratoga, CA (US)

(73) Assignee: eBay Inc., San Jose, CA (US)

( * ) Notice: Subject to any disclaimer, the term of this patent is extended or adjusted under 35 U.S.C. 154(b) by 143 days.

(21) Appl. No.: 12/005,005

(22) Filed: Dec. 20, 2007

(65) Prior Publication Data

US 2009/0125543 A1    May 14, 2009

Related U.S. Application Data

(60) Provisional application No. 60/991,569, filed on Nov. 30, 2007, provisional application No. 60/991,539, filed on Nov. 30, 2007, provisional application No. 60/988,967, filed on Nov. 19, 2007, provisional application No. 60/986,879, filed on Nov. 9, 2007.

(51) Int. Cl.
*G06F 7/00* (2006.01)
*G06F 17/30* (2006.01)

(52) U.S. Cl.
USPC ............................................. 707/793

(58) Field of Classification Search
USPC ............... 707/790, 791, 793, 999.102
See application file for complete search history.

(56) References Cited

U.S. PATENT DOCUMENTS

| | | | |
|---|---|---|---|
| 5,136,690 A | 8/1992 | Becker et al. | |
| 5,185,696 A * | 2/1993 | Yoshino et al. | 705/36 R |
| 5,390,113 A * | 2/1995 | Sampson | 705/30 |
| 5,577,106 A | 11/1996 | Tanaka et al. | |
| 5,596,703 A | 1/1997 | Eick et al. | |
| 5,778,178 A | 7/1998 | Arunachalam | |
| 5,819,226 A | 10/1998 | Gopinathan et al. | |
| 5,870,559 A * | 2/1999 | Leshem et al. | 709/224 |
| 5,950,179 A | 9/1999 | Buchanan et al. | |
| 5,963,922 A | 10/1999 | Helmering | |
| 5,987,500 A | 11/1999 | Arunachalam | |
| 6,032,188 A | 2/2000 | Mairs et al. | |
| 6,094,643 A | 7/2000 | Anderson et al. | |

(Continued)

FOREIGN PATENT DOCUMENTS

JP    55110367 A    8/1980

OTHER PUBLICATIONS

Chakrabarti et al, D. Fully Automatic Cross-associations, in Proceedings of the Tenth ACM SIGKDD International Conference on Knowledge Discovery and Data Mining. (2004).*

(Continued)

*Primary Examiner* — Rehana Perveen
*Assistant Examiner* — Mark E Hershley
(74) *Attorney, Agent, or Firm* — Schwegman Lundberg & Woessner, P.A.

(57) ABSTRACT

In some example embodiments, a system and method is illustrated as including retrieving account data including at least one of an account identifier and transaction data. Further, in some example embodiments, a data structure is generated that includes the account data. Additionally, in some example embodiments, the data structure is sorted where the data structure includes the account data to create a sorted account data structure. In some example embodiments, a sorted account data structure is displayed.

26 Claims, 17 Drawing Sheets

(56) References Cited

U.S. PATENT DOCUMENTS

| | | | |
|---|---|---|---|
| 6,208,720 B1 | 3/2001 | Curtis et al. | |
| 6,212,556 B1 | 4/2001 | Arunachalam | |
| 6,256,032 B1* | 7/2001 | Hugh | 715/854 |
| 6,321,206 B1 | 11/2001 | Honarvar | |
| 6,405,173 B1 | 6/2002 | Honarvar et al. | |
| 6,430,545 B1 | 8/2002 | Honarvar et al. | |
| 6,490,566 B1 | 12/2002 | Schmidt | |
| 6,609,120 B1 | 8/2003 | Honarvar et al. | |
| 6,658,393 B1 | 12/2003 | Basch et al. | |
| 6,708,155 B1 | 3/2004 | Honarvar et al. | |
| 6,918,096 B2 | 7/2005 | Hugh et al. | |
| 7,464,056 B1* | 12/2008 | Campbell et al. | 705/39 |
| 7,536,348 B2 | 5/2009 | Shao et al. | |
| 7,558,768 B2 | 7/2009 | Parida | |
| 7,587,453 B2* | 9/2009 | Bhrara et al. | 709/204 |
| 7,626,586 B1 | 12/2009 | Perttunen | |
| 7,813,822 B1* | 10/2010 | Hoffberg | 700/94 |
| 8,103,566 B1* | 1/2012 | Petruzzi | 705/35 |
| 8,165,973 B2 | 4/2012 | Alexe et al. | |
| 8,341,111 B2 | 12/2012 | Patil et al. | |
| 2001/0010730 A1 | 8/2001 | Rhoads | |
| 2001/0037315 A1* | 11/2001 | Saliba et al. | 705/70 |
| 2001/0037316 A1 | 11/2001 | Shiloh | |
| 2002/0026348 A1* | 2/2002 | Fowler et al. | 705/10 |
| 2002/0046049 A1* | 4/2002 | Siegel et al. | 705/1 |
| 2002/0046113 A1 | 4/2002 | Pisano et al. | |
| 2002/0072993 A1 | 6/2002 | Sandus et al. | |
| 2002/0103660 A1* | 8/2002 | Cramon et al. | 705/1 |
| 2002/0123957 A1* | 9/2002 | Notarius et al. | 705/37 |
| 2002/0133721 A1 | 9/2002 | Adjaoute | |
| 2003/0009411 A1* | 1/2003 | Ram et al. | 705/37 |
| 2003/0018558 A1* | 1/2003 | Heffner et al. | 705/37 |
| 2003/0026404 A1* | 2/2003 | Joyce et al. | 379/144.01 |
| 2003/0036989 A1* | 2/2003 | Bhatia | 705/36 |
| 2003/0061132 A1* | 3/2003 | Yu et al. | 705/30 |
| 2003/0097320 A1 | 5/2003 | Gorden | |
| 2003/0172013 A1* | 9/2003 | Block et al. | 705/33 |
| 2003/0204426 A1 | 10/2003 | Honarvar et al. | |
| 2003/0216984 A1* | 11/2003 | Wang | 705/35 |
| 2004/0034573 A1* | 2/2004 | Cohen | 705/26 |
| 2004/0034616 A1* | 2/2004 | Witkowski et al. | 707/1 |
| 2004/0122803 A1 | 6/2004 | Dom et al. | |
| 2004/0148211 A1 | 7/2004 | Honarvar et al. | |
| 2004/0164983 A1 | 8/2004 | Khozai | |
| 2004/0204925 A1 | 10/2004 | Alon et al. | |
| 2004/0236688 A1* | 11/2004 | Bozeman | 705/42 |
| 2004/0249866 A1 | 12/2004 | Chen et al. | |
| 2005/0144111 A1* | 6/2005 | Manstein et al. | 705/37 |
| 2005/0182708 A1 | 8/2005 | Moudgal | |
| 2005/0187827 A1* | 8/2005 | Weiss et al. | 705/22 |
| 2005/0187881 A1* | 8/2005 | McGiffin et al. | 705/64 |
| 2005/0188294 A1 | 8/2005 | Kuchinsky et al. | |
| 2005/0222929 A1* | 10/2005 | Steier et al. | 705/35 |
| 2005/0251371 A1 | 11/2005 | Chagoly et al. | |
| 2005/0256735 A1* | 11/2005 | Bayne | 705/1 |
| 2005/0273820 A1 | 12/2005 | Elberbaum | |
| 2005/0283494 A1* | 12/2005 | Colossi et al. | 707/102 |
| 2006/0028471 A1* | 2/2006 | Kincaid et al. | 345/440 |
| 2006/0069635 A1* | 3/2006 | Ram et al. | 705/37 |
| 2006/0149674 A1* | 7/2006 | Cook et al. | 705/44 |
| 2006/0173772 A1* | 8/2006 | Hayes et al. | 705/37 |
| 2006/0229921 A1* | 10/2006 | Colbeck | 705/7 |
| 2006/0235658 A1 | 10/2006 | Nitta et al. | |
| 2006/0235764 A1 | 10/2006 | Bamborough et al. | |
| 2006/0287910 A1 | 12/2006 | Kuchar et al. | |
| 2007/0027662 A1* | 2/2007 | Parida | 703/2 |
| 2007/0033105 A1* | 2/2007 | Collins et al. | 705/14 |
| 2007/0055662 A1 | 3/2007 | Edelman et al. | |
| 2007/0100875 A1* | 5/2007 | Chi et al. | 707/102 |
| 2007/0239694 A1 | 10/2007 | Singh et al. | |
| 2007/0282673 A1* | 12/2007 | Nagpal et al. | 705/11 |
| 2008/0011844 A1* | 1/2008 | Tami et al. | 235/385 |
| 2008/0015938 A1* | 1/2008 | Haddad et al. | 705/14 |
| 2008/0135612 A1* | 6/2008 | Silbernagl et al. | 235/382 |
| 2008/0140682 A1* | 6/2008 | Grosset et al. | 707/100 |
| 2008/0162259 A1 | 7/2008 | Patil et al. | |
| 2009/0122065 A1 | 5/2009 | Patil et al. | |
| 2009/0144213 A1 | 6/2009 | Patil et al. | |
| 2009/0234683 A1 | 9/2009 | Anderson et al. | |
| 2010/0005051 A1 | 1/2010 | Agrawal et al. | |
| 2010/0169137 A1 | 7/2010 | Jastrebski et al. | |
| 2013/0138587 A1* | 5/2013 | Patil et al. | 706/12 |

OTHER PUBLICATIONS

"U.S. Appl. No. 09/793,843, Examiner Interview Summary mailed Mar. 17, 2005", 3 pgs.

"U.S. Appl. No. 09/793,843, Final Office Action mailed Feb. 9, 2007", 5 pgs.

"U.S. Appl. No. 09/793,843, Non Final Office Action mailed Jun. 13, 2006", 18 pgs.

"U.S. Appl. No. 09/793,843, Non Final Office Action mailed Dec. 9, 2005", 16 pgs.

"U.S. Appl. No. 09/793,843, Notice of Allowance mailed Apr. 13, 2007", 8 pgs.

"U.S. Appl. No. 09/793,843, Preliminary Amendment filed Aug. 19, 2004", 11 pgs.

"U.S. Appl. No. 09/793,843, Response filed Feb. 20, 2007 to Final Office Action mailed Feb. 9, 2007", 17 pgs.

"U.S. Appl. No. 09/793,843, Response filed Feb. 22, 2006 to Non Final Office Action mailed Dec. 9, 2005", 17 pgs.

"U.S. Appl. No. 09/793,843, Response filed Apr. 5, 2005 to Restriction Requirement mailed Mar. 17, 2005", 13 pgs.

"U.S. Appl. No. 09/793,843, Response filed Aug. 3, 2006 to Non Final Office Action mailed Jun. 13, 2006", 20 pgs.

"U.S. Appl. No. 09/793,843, Restriction Requirement mailed Mar. 17, 2005", 8 pgs.

"U.S. Appl. No. 11/618,465, Non-Final Office Action mailed Apr. 13, 2009", 17 pgs.

"U.S. Appl. No. 11/618,465, Response filed Aug. 13, 2009 to Non Final Office Action mailed Apr. 13, 2009", 12 pgs.

"Rete algorithm—Wikipedia", http://en.wikipedia.org/wiki/Rete_algorithm#Rete_III, (Jun. 28, 2007).

Lindorff, Dave, "CIO Insight", New York; vol. 1(20), ISSN15350096, Proquest document ID: 234810651, (Nov. 2, 2002), 6.

U.S. Appl. No. 11/618,465, Final Office Action mailed Apr. 15, 2010, 16 pgs.

"U.S. Appl. No. 11/618,465, Examiner Interview Summary mailed Dec. 14, 2009", 3 pgs.

"U.S. Appl. No. 11/618,465, Non-Final Office Action mailed Aug. 3, 2010", 15 pgs.

"U.S. Appl. No. 11/618,465, Response filed Jul. 15, 2010 to Final Office Action mailed Apr. 15, 2010", 11 pgs.

"U.S. Appl. No. 11/618,465, Response filed Dec. 3, 2010 to Non Final Office Action mailed Aug. 3, 2010", 23 pgs.

"U.S. Appl. No. 11/961,817, Non Final Office Action mailed Dec. 13, 2010", 27 pgs.

"U.S. Appl. No. 11/963,452, Non Final Office Action mailed Nov. 18, 2010", 15 pgs.

Amann, Bernd, et al., "Gram: A Graph Data Model and Query Language", 1992 Proceeding ECHT '92 Proceedings of the ACM conference on Hypertext, (1992), 201-211.

Graves, Mark, et al., "Graph Database Systems", Engineering in Medicine and Biology Magazine, IEEE; vol. 14 Issue 6, (Dec. 1995), 737-745.

Herman, Ivan, et al., "GraphXML—An XML-Based Graph Description Format", Lecture Notes in Computer Science, 2001, vol. 1984, (2001), 52-62.

Imielinski, Tomasz, et al., "MSQL: A Query Language for Database Mining; 1999; Data Mining and Knowledge Discover", 1999 Kluwer Academic Publishers, Manufactured in the Netherlands; vol. 3, No. 4, (1999), 373-408.

"U.S. Appl. No. 11/618,465, Final Office Action mailed Feb. 4, 2011", 15 pgs.

"U.S. Appl. No. 11/618,465, Pre-Appeal Brief Request filed Apr. 4, 2011", 5 pgs.

(56) References Cited

OTHER PUBLICATIONS

"U.S. Appl. No. 11/961,817, Final Office Action mailed Apr. 19, 2011", 9 pgs.

"U.S. Appl. No. 11/961,817, Response filed Mar. 14, 2011 to Non Final Office Action mailed Dec. 13, 2010", 15 pgs.

"U.S. Appl. No. 11/963,452, Notice of Allowance mailed Jun. 20, 2011", 11 pgs.

"U.S. Appl. No. 11/963,452, Response filed Feb. 18, 2011 to Non Final Office Action mailed Nov. 18, 2010", 11 pgs.

"U.S. Appl. No. 11/618,465, Appeal Brief filed Jul. 8, 2011", 25 pgs.

"U.S. Appl. No. 11/618,465, Applicant's Summary of Examiner Interview filed Sep. 19, 2011", 1 pg.

"U.S. Appl. No. 11/618,465, Decision on Pre-Appeal Brief Request mailed Jun. 8, 2011", 2 pgs.

"U.S. Appl. No. 11/618,465, Examiner Interview Summary mailed Aug. 31, 2011", 3 pgs.

"U.S. Appl. No. 11/618,465, Examiner's Answer to Appeal Brief mailed Aug. 19, 2011", 21 pgs.

"U.S. Appl. No. 11/618,465, Reply Brief filed Sep. 19, 2011", 3 pgs.

"U.S. Appl. No. 11/618,465, Second Examiner's Answer to Appeal Brief mailed Aug. 31, 2011", 20 pgs.

"U.S. Appl. No. 11/961,817, Examiner Interview Summary mailed Jul. 18, 2011", 4 pgs.

"U.S. Appl. No. 11/961,817, Response Filed Jul. 14, 2011 to Final Office Action Received Apr. 19, 2011", 10 pgs.

"U.S. Appl. No. 13/220,209 , Response filed Jul. 31, 2012 to Non Final Office Action mailed May 2, 2012", 9 pgs.

"U.S. Appl. No. 13/220,209, Non Final Office Action mailed May 2, 2012", 23 pgs.

"U.S. Appl. No. 13/220,209, Notice of Allowance mailed Aug. 20, 2012", 9 pgs.

Neal, Radford M, "Probabilistic Inference Using Markov Chain Monte Carlo Methods", Technical Report, Department of Computer Science University of Toronto, (Sep. 25, 1993), 144 pgs.

"U.S. Appl. No. 11/961,817, Response filed Aug. 7, 2013 to Non Final Office Action mailed Mar. 7, 2013", 11 pgs.

"U.S. Appl. No. 11/961,817, Final Office Action mailed Aug. 16, 2013", 9 pgs.

"U.S. Appl. No. 11/961,817, Non Final Office Action mailed Mar. 7, 2013", 10 pgs.

\* cited by examiner

ROW [1619134]: 123456789
COL [9104245]: 987654321
VAL [1619134][9104245]: TOTAL $ VALUE

TRANSACTION DATA REPRESENTATIONS USING AN ADJACENCY MATRIX

CROSS REFERENCE TO RELATED APPLICATIONS

This is a U.S. Patent Application that claims priority under 35 U.S.C. §119(e) to U.S. Provisional Patent Application titled "TRANSACTION DATA REPRESENTATIONS USING AN ADJACENCY MATRIX," (Ser. No. 60/991,569) filed on Nov. 30, 2007 which is incorporated by reference in its entirety herein. Moreover, the present application is related to U.S. Provisional Patent Application titled: "GRAPH PATTERN RECOGNITION INTERFACE" as shown in the U.S. Provisional Patent Application (Ser. No. 60/991,539) filed on Nov. 30, 2007, and incorporated by reference in it entirety herein. A copy of this provisional patent application is attached herein as an Appendix A. Additionally, the present application is related to the U.S. Provisional Patent Application titled: "GLOBAL CONDUCT SCORE AND ATTRIBUTE DATA UTILIZATION" (Ser. No. 60/988,967) filed on Nov. 19, 2007. A copy of this provisional patent application is attached herein as an Appendix B. The present application is also related to the U.S. Provisional Patent Application titled: "NETWORK RATING VISUALIZATION" (Ser. No. 60/986,879) filed on Nov. 9, 2007. A copy of this provisional patent application is attached herein as an Appendix C. Further, the present application is related to U.S. Patent Application titled: "ASSOCIATED COMMUNITY PLATFORM" (Ser. No. 11/618,465) filed on Dec. 29, 2006. A copy of this patent application is attached herein as an Appendix D.

TECHNICAL FIELD

The present application relates generally to the technical field of algorithms and programming and, in one specific example, the retrieving of transaction data for graphical display.

BACKGROUND

The large volume of transactions occurring over networks such as the Internet create a large amount of data. This data is typically stored and accessed on a piecemeal basis to determine the characteristics of specific transactions. These characteristics may include the item sold, the price of the item, the parties to the transaction, or other useful information.

BRIEF DESCRIPTION OF THE DRAWINGS

Some embodiments are illustrated by way of example and not limitation in the figures of the accompanying drawings in which.

DETAILED DESCRIPTION

Figure 1:
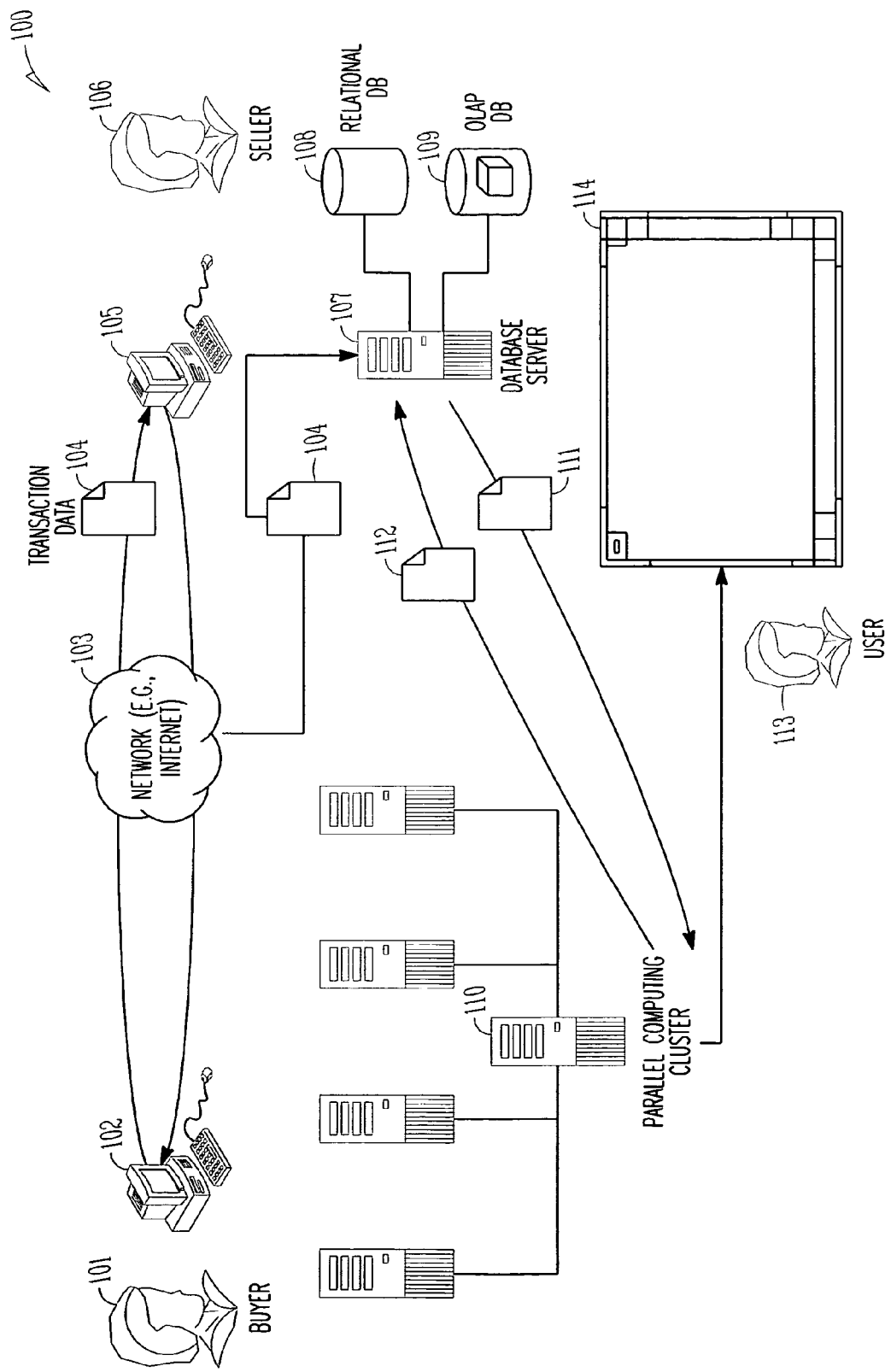
FIG. 1 is a diagram of a system, according to an example embodiment, used to generate an adjacency matrix representation of transaction data.

A system and method for displaying transaction data using an adjacency matrix representation is illustrated. In the following description, for purposes of explanation, numerous specific details are set forth to provide a thorough understanding of some embodiments. It may be evident, however, to one skilled in the art that some embodiments may be practiced without these specific details.

In some example embodiments, a system and method for displaying transaction data using an adjacency matrix representation is illustrated. Large amounts of data are generated and retained by companies that run e-commerce web sites and other sites that transact in good and services. This data can easily range into the petabyte size for large merchants. The relationships captured within this data may include transactions, accounts held by persons (e.g., legal person such as corporations, and natural persons), amounts spent, the persons between whom a transaction takes place, the time of transactions, the date of transactions, and other suitable data describing a transaction. In one example embodiment, a transaction may be any type of relationship between two or more persons, where this relationship may be represented in a digital format. In some example cases, this data may be analyzed to reveal certain trends. These trends may include the existence of on-going fraud, the buying habits of customers and potential customers, and a host of other information.

Some example embodiments may include transaction data retrieved based upon accounts and the transaction data associated with these accounts. This transaction data may include sales made by one seller, associated with an account, as identified by an account identifier, to a purchaser associated with a different account identified by an account identifier. In addition to sales, other types of transactions between sellers, or more generally person identified by accounts, made be considered transaction data. These transaction types may include email exchanges as tracked by IP address, common transaction amounts between or by persons identified by accounts, or transactions engaged in by persons having similar geographic locations.

In one example embodiment, an adjacency matrix is generated where the indices of the matrix represent accounts and the positions within the matrix are associated with the existence of attributes between those accounts. This adjacency matrix may be converted into a graph where the nodes are accounts and the edges are transactions between accounts and information describing these transactions. In some example embodiments, a plurality of adjacency matrices are generated such that a multidimensional array of adjacency matrices are generated. In some example embodiments, another data structure in lieu of a multi-dimensional array of adjacency matrices may be implemented such as a hash table, binary search tree, re-black tree, or some other suitable data structure. In some example embodiments, the computational complexity of the sorting problem posed by a particular set of transaction data may dictate the use of one data structure as opposed to another.

In some example embodiments, sorting may be performed using any one of a number of comparison based or hybrid sorting algorithms. For example, in some embodiments, a merge sort algorithm or a quick sort algorithm may be implemented. In some example embodiments, a hybrid of some type of comparison based sorting algorithm (e.g., the aforementioned merge sort or quick sort) with $\Theta(n \log n)$ performance may be implemented in conjunction with another sorting algorithm with $\Theta(n^2)$ performance. Sorting algorithms with $\Theta(n^2)$ performance include, for example, bubble sort and selection sort. In some example embodiments, a parallel sort-merge algorithm may be implemented. Some example embodiments may include using any sorting algorithm that may be classified as having a worst case computational time of better than $\Theta(n^2)$.

In one example embodiment, transaction data for a plurality of accounts is represented by an adjacency matrix, where the accounts are associated with the indices of the X and Y axis of this adjacency matrix. Elements within the matrix defined by the X and Y axis represent relationships between accounts. Using this matrix, all accounts, and transactions engaged in using these accounts over some period of time, may be represented. This period of time may be a day, a week, or some other suitable period of time. Once the matrix is constructed, it may be sorted/transformed according to one or more characteristics of a transaction. For example, the matrix may be sorted along the X and Y indices by monetary value of the transactions taking place, the time of day the transactions take place, or some other attribute of an account. Further, specific relationships between accounts may be represented at a more granular level through the use of a graph, where the accounts form the nodes of the graph, and the transactions form the edges connecting the nodes.

In some example embodiments, portions of the adjacency matrix may be further organized (e.g., sorted and/or transformed) such that specific portions of the graph are organized in a more detailed manner. For example, if an adjacency matrix of accounts related based upon transaction amounts is shown, and one would also like to see which of these transactions occurred during a certain time of day, then the matrix would have to be further sub-divided and organized. This further sub-division may, in some example embodiments, be performed recursively or iteratively.

In some example embodiments, account data in the form of an account identifier is retrieved. The account identifier may be a types of numeric value such as an account number that may be used to uniquely identify an account held by a seller or purchaser of goods or services. Alternatively, an account identifier may be a type of formal name (e.g., a network handle) associated with a seller or purchaser of good or services. The account identified by the account identifier may form the nodes of a graph, and the axes of the adjacency matrix. Further, in some example embodiments, attributes of these accounts in the form of transaction data may be retrieved. This transaction data may form edges connecting these nodes, and may form coordinates within the adjacency matrix. In some example embodiments, a plurality of adjacency matrices may be generated and combined into a multidimensional array. Some example embodiments may include, sorting and transforming the matrix or matrices using one or more of the above referenced sorting algorithms, or some other suitable sorting algorithm. Once sorted, then patterns may be discerned within the matrix or matrices via visual inspection or using some type of automated inspection regime. This automated inspection regime may utilize some sort of Artificial Intelligence (A.I.), or statistical algorithm.

Some example cases may involve the utilization of a system and method for "Network Rating Visualization" as shown in U.S. Provisional Patent Application 60/986,879 incorporated by reference in it entirety herein. Through using this system and method, a more granular depiction of the various nodes and edges appearing in the adjacency matrix may be presented. Further, through using the system and method for "Network Rating Visualization," additional patterns may be identified, classified, and added to the taxonomy of graphs (e.g., a taxonomy database) for future reference. In some example embodiments, this taxonomy, or portions thereof, may be displayed as part of a GUI to assist persons such as fraud prevention specialists, marketing professionals or other suitable persons. This GUI and the logic associated therewith may be shown as part of a system and method titled "Graph Pattern Recognition Interface" as shown in U.S. Provisional Patent Application 60/991,539 incorporated by reference in it entirety herein.

In some example embodiments, the data used to generate the nodes and edges, and ultimately the data structures (e.g., adjacency matrices) illustrated herein, may be derived from systems and method for "Global Conduct Score and Data Attribute Utilization." This system and method is shown in U.S. Provisional Patent Application 60/988,967 which is incorporated in its entirety herein. Additionally, the system and method for an "Associated Community Platform," as shown in U.S. patent application Ser. No. 11/618,465, may also be used as a basis to derive the data used to generate the nodes and edges referenced herein. This application Ser. No. 11/618,465 is also incorporated by reference in its entirety herein.

Example System

FIG. 1 is a diagram of an example system 100 used to generate an adjacency matrix representation of transaction data. Shown is a buyer 101 utilizing a computer system 102 which generates transaction data 104. In some example embodiments, this transaction data 104 is transmitted across a network 103 wherein this network 103 may be, for example, an intranet or an Internet. This transaction data 104 may be received by a seller 106 utilizing a computer system 105. Further, in some example embodiments, this transaction data 104 is recorded by a database server 107. Operatively coupled to this database server 107 is any one of a number of databases including, for example, a relational database 108 and/or an Online Analytic Processing (OLAP) database 109. In some example cases, a user 113 utilizing a GUI 114 may generate a transaction data request 112 that is sent to the database server 107. This transaction data request 112 may be transmitted across the network 103 (not shown), or across some other suitable network (e.g., a Wide Area Network (WAN), or a Local Area Network (LAN)). In response to the transaction data request 112, requested transaction data 111 may be sent to a parallel computing cluster 110 for processing. This transaction data 111 may contain an account identifier and transaction data. This parallel computing cluster 110 may take the requested transaction data 111 and process it so as to render this data into some type of format that may be viewed in the GUI 114. In some example embodiments, this format may be, for example, one or more adjacency matrices. In lieu of, or in addition to, the parallel computing cluster, a High-Performance Computing (HPC) cluster, a vector based computer, a Beowulf cluster, or some type of suitable parallel or distributed computing cluster may be used.

In some example embodiments, in lieu of retrieving the requested transaction data 111 from the database server 107, a real-time solution may be implemented to retrieve transaction data and display it in real time. This real-time solution may include establishing a Transmission Control Protocol/Internet Protocol (TCP/IP) or User Datagram Protocol/IP connection between the parallel computing cluster 110 and a computer system (not pictured) monitoring the network 103. In one example embodiment, when the computer system monitoring the network 103 discovers transaction data 104, the computer system monitoring the network 103 sends a copy of this transaction data 104 to the computing cluster 110 for processing. Processing may include sorting the transaction data 104 so as to render it in a GUI 114. Various principles of socket programming may be used in conjunction with TCP/IP and UDP/IP to facilitate this real-time solution.

Figure 2:
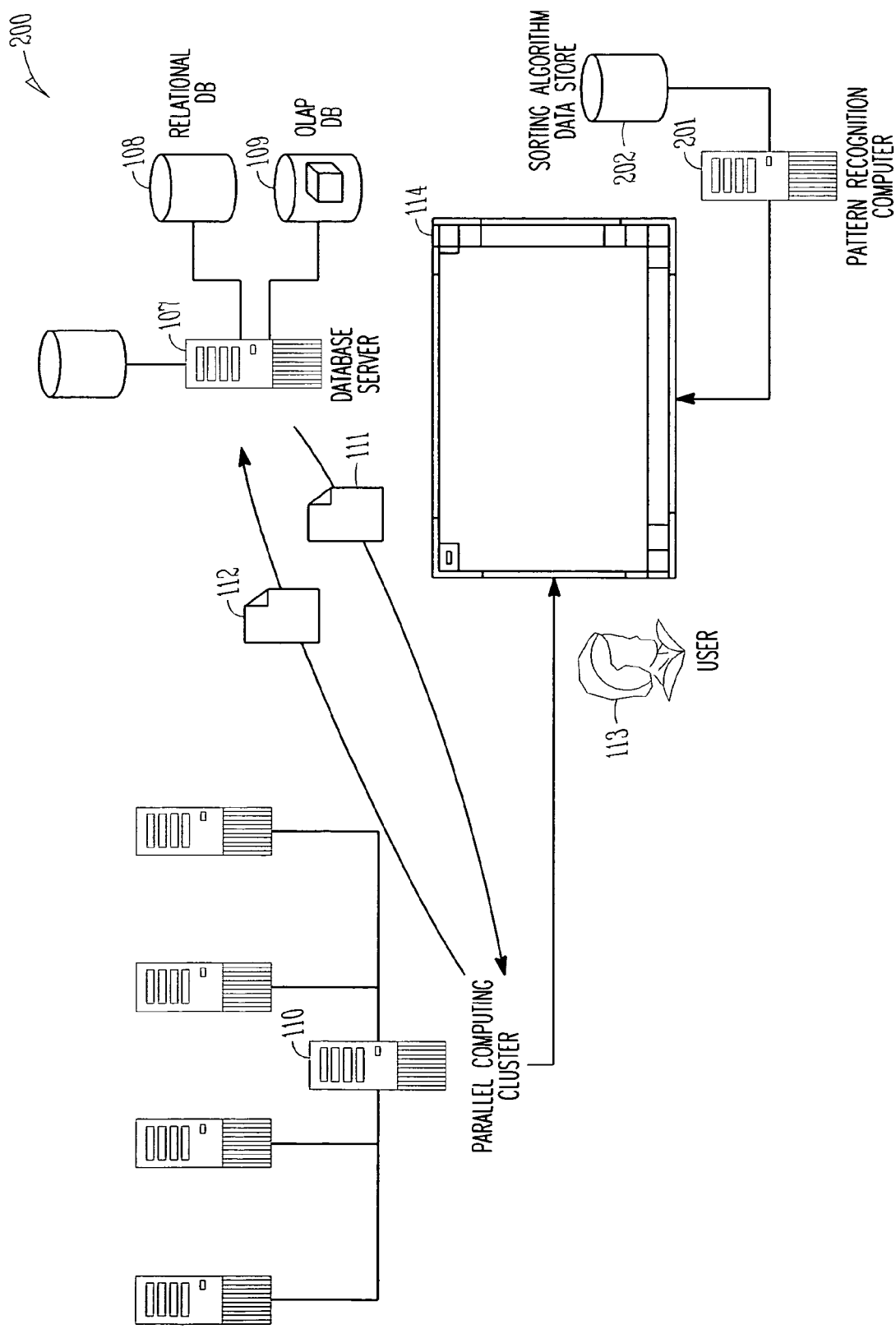
FIG. 2 is a diagram of a system, according to an example embodiment, illustrating the use of a pattern recognition computer, and associated sorting algorithms residing thereon, to sort requested transaction data as it may appear in a Graphical User Interface (GUI).

FIG. 2 is a diagram of an example system 200 illustrating the use of a pattern recognition computer in associated sorting algorithms residing thereon to sort the requested transaction data 111 as it may appear in the GUI 114. Illustrated is a pattern recognition computer 201 that is operatively connected to a data store 202 containing one or more sorting algorithms. These sorting algorithms are more fully shown below and may include some type of sorting algorithm that can sort in $\Theta(n \log n)$ time, $\Theta(n^2)$ time, or some other suitable time. Once the requested transaction data 111 is sorted using a sorting algorithm retrieved from the sorting algorithm data store 202, this transaction data may be displayed on the GUI 114.

Example Matrices

Figure 3:
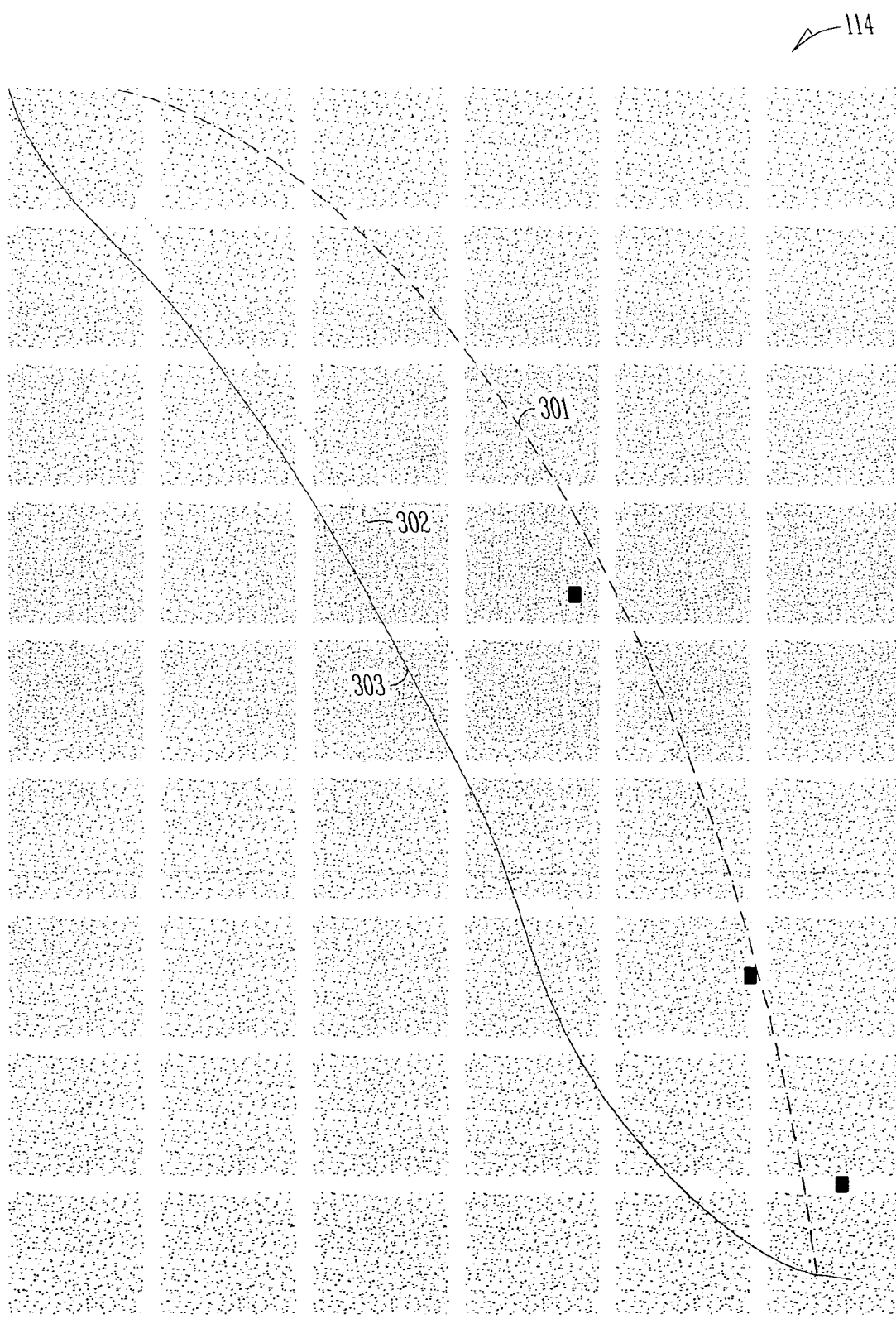
FIG. 3 is a diagram of a GUI, according to an example embodiment, displaying a visual representation of an adjacency matrix.

FIG. 3 is a diagram of an example GUI 114 displaying a visual representation of an adjacency matrix. In some example embodiments, this adjacency matrix may be composed of various points that denote transactions between accounts such that along the X-axis of the adjacency matrix, receiving accounts are shown, whereas along the Y-axis of the adjacency matrix sending accounts are shown. Points (e.g., convergence points) where a receiving account and sending account intersect may reflect transactions between the sending account and the receiving account. For example, illustrated is a line 301 that results after the application of one or more sorting algorithms to the requested transaction data 111. This line 301 may reflect, for example, accounts that engaged in one transaction. Further, a line 302 is shown reflecting accounts that sent more than one transaction. Additionally, a line 303 is shown reflecting accounts that are involved in less than one transaction.

Figure 4:
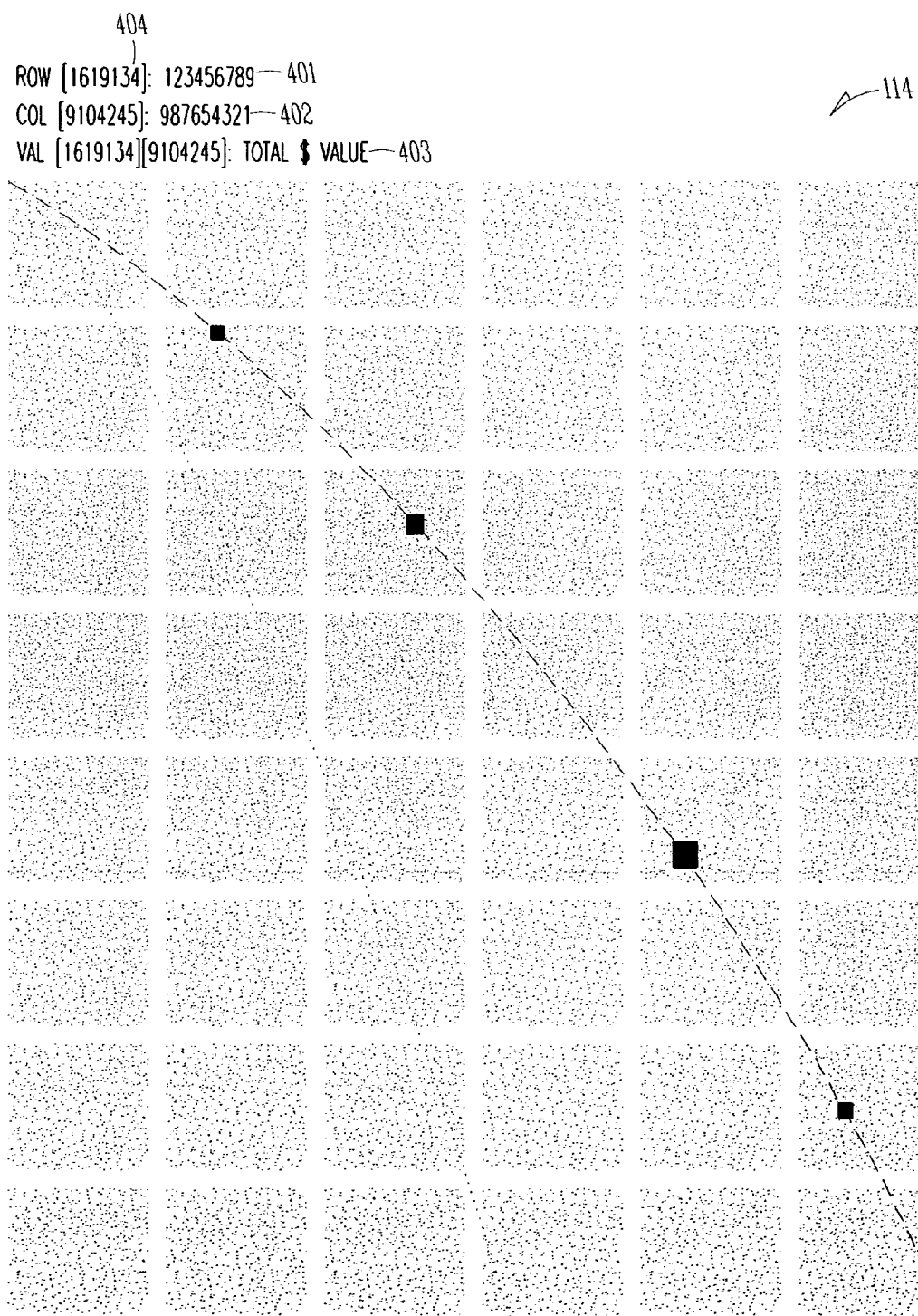
FIG. 4 is a diagram of a more granular view of a visual representation of an adjacency matrix, according to an example embodiment, as it may appear within a GUI.

FIG. 4 is a diagram of a more granular view of an example visual representation of an adjacency matrix as it may appear within the GUI 114. Shown is a portion of the adjacency matrix displayed in FIG. 3, but this portion is more granular. In some example embodiments, a row account number 401 is shown denoting the account number of a particular row. Further, a column account number 402 is also shown denoting the account number corresponding to a particular column. Further, a convergence value 403 is also shown denoting the value where the account number for the row 401 and the account for the column 402 converge. This value reflected at 403 may reflect values such as, for example, the total value of transactions between two accounts, the per month value of transactions between two accounts, the number of transactions between two accounts, a boolean value denoting whether or not the two accounts are within the same geographical location or political boundary (e.g., a country), or some other suitable value. In some example embodiments, the various account numbers (e.g., 401 and 402) may be represented as an index value for the matrix as reflected in, for example, index value 404. Further, in some example cases, the convergence value 403 may reflect the properties of the various accounts such as the accounts denoted by 401 and 402.

Figure 5:
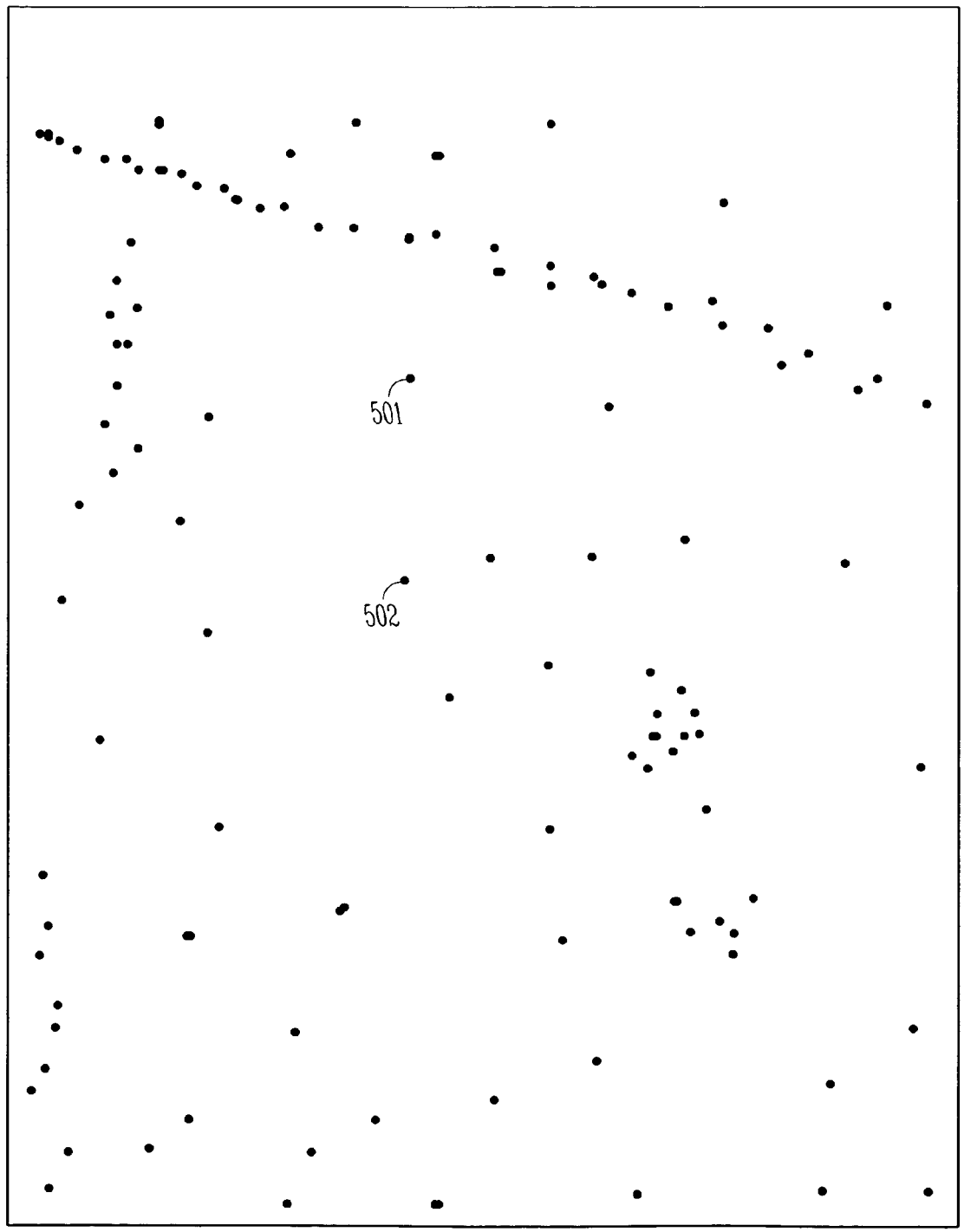
FIG. 5 is a diagram of a more granular view of one visual representation of an adjacency matrix, according to an example embodiment, that may appear within a GUI.

FIG. 5 is a diagram of a more granular view of an example visual representation of an adjacency matrix that may appear within, for example, the GUI 114. In some example embodiments, a particular section or quadrant of an adjacency matrix may be viewed such that a plurality of convergence points such as convergence points 501 and 502 may be shown. These convergence points may reflect points where a sending accounting and a receiving account may exchange data in the form of moneys, transactions, or other types of relationships. In one example embodiment, a user such as user 113 may be able to view the adjacency matrix appearing in GUI 114 at a more granular level through, in some example cases, zooming in on a portion of the adjacency matrix they would like to view. This zooming in feature function is reflected in FIG. 5. This zoom-in function may be facilitated via the user 113 using an input device such as a mouse, keyboard or light pen such that when the focus is placed on a portion of the GUI 114, a more granular view is presented.

Figure 6:
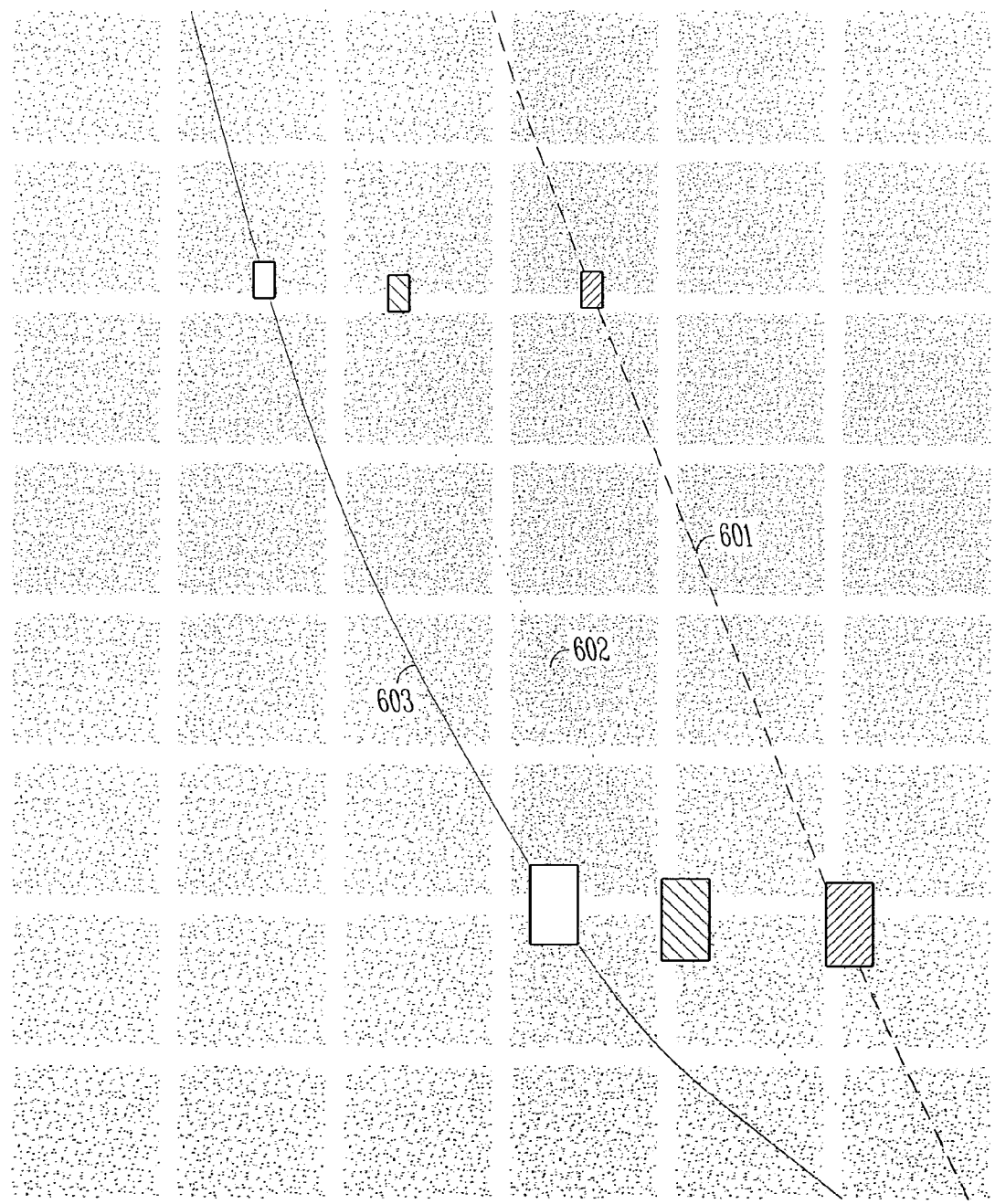
FIG. 6 is a diagram of an adjacency matrix as it may appear within a GUI, according to an example embodiment, wherein the adjacency matrix shows sending and receiving accounts and transactions between these two accounts that are sorted.

FIG. 6 is a diagram of an example visual representation of an adjacency matrix as it may appear within the GUI 114 wherein this example adjacency matrix shows sending and receiving accounts and transactions between these two accounts that are sorted. Illustrated is a line 601 resulting from the sorting of data contained in this adjacency matrix. This line 601 may reflect some value relating to transactions engaged in between a sending and a receiving account. Further, a line 602 is shown that may also further reflect additional values relating to transaction data pertaining to the sending and receiving accounts. Similarly, line 603 may also reflect transactions engaged in by the sending and receiving accounts. As discussed elsewhere, the level of granularity as reflected in FIG. 6 may be increased or decreased based upon a zoom-in function selected by the user 113.

Figure 7:
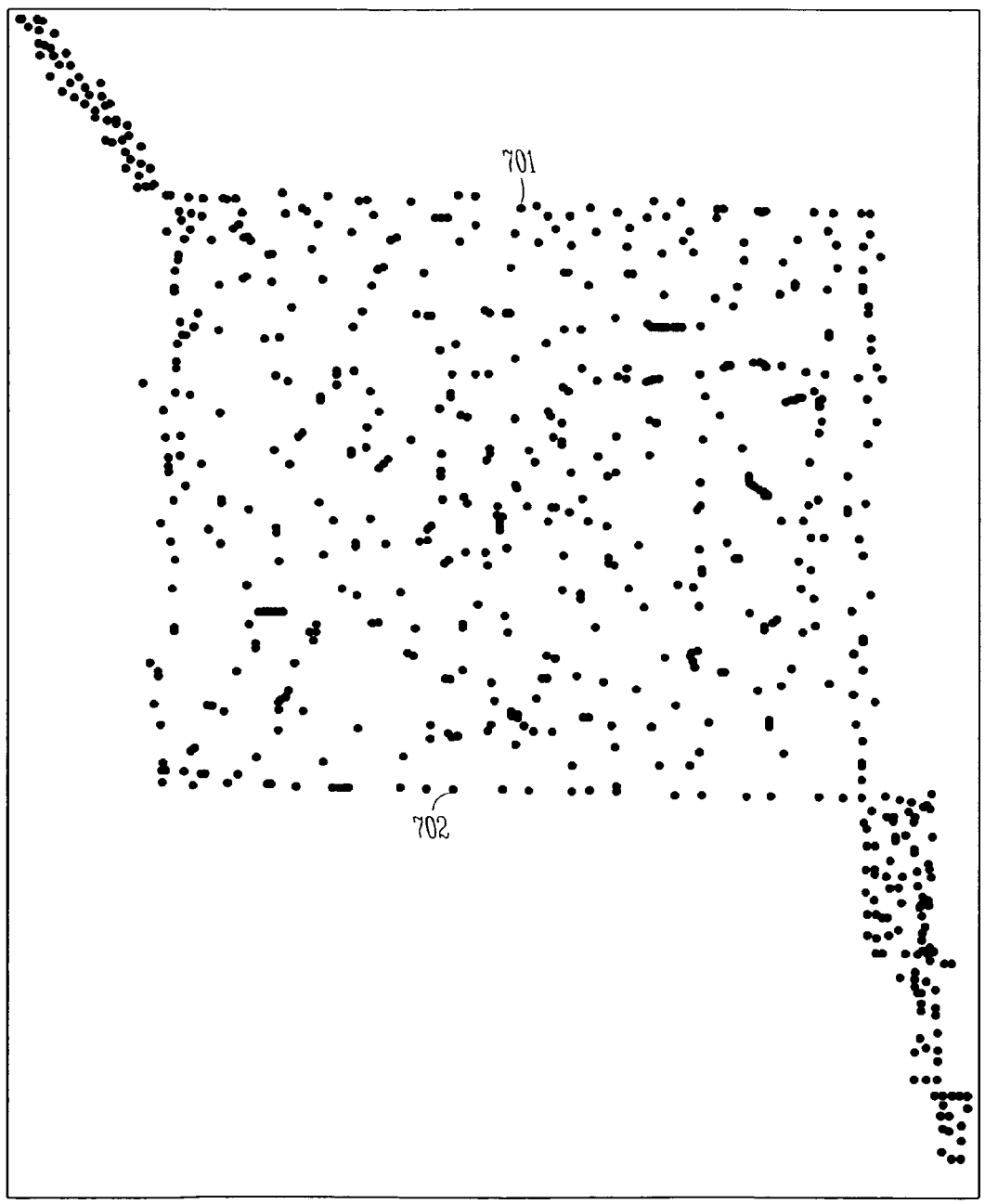
FIG. 7 is a diagram of a portion of an adjacency matrix, according to an example embodiment, as may be displayed in the GUI, where this portion is a particular section or quadrant of the adjacency matrix.

FIG. 7 is a diagram of an example visual representation of a portion of an adjacency matrix as may be displayed in, for example, at GUI 114 where this portion is, for example, a particular section or quadrant of the adjacency matrix. Shown is a quadrant portion of an adjacency matrix reflecting transactions between various sending and receiving accounts. Shown for example is a convergence point 701 reflecting a particular point wherein a transaction is engaged in between a sending and a receiving account. Similarly, a convergence point 702 reflects additional information regarding a transaction between a sending and a receiving account. As discussed elsewhere, the level of granularity reflected in FIG. 7 may be dictated in part by a user 113 utilizing the GUI 114 so as to zoom-in or focus on a particular portion of an adjacency matrix.

Figure 8:
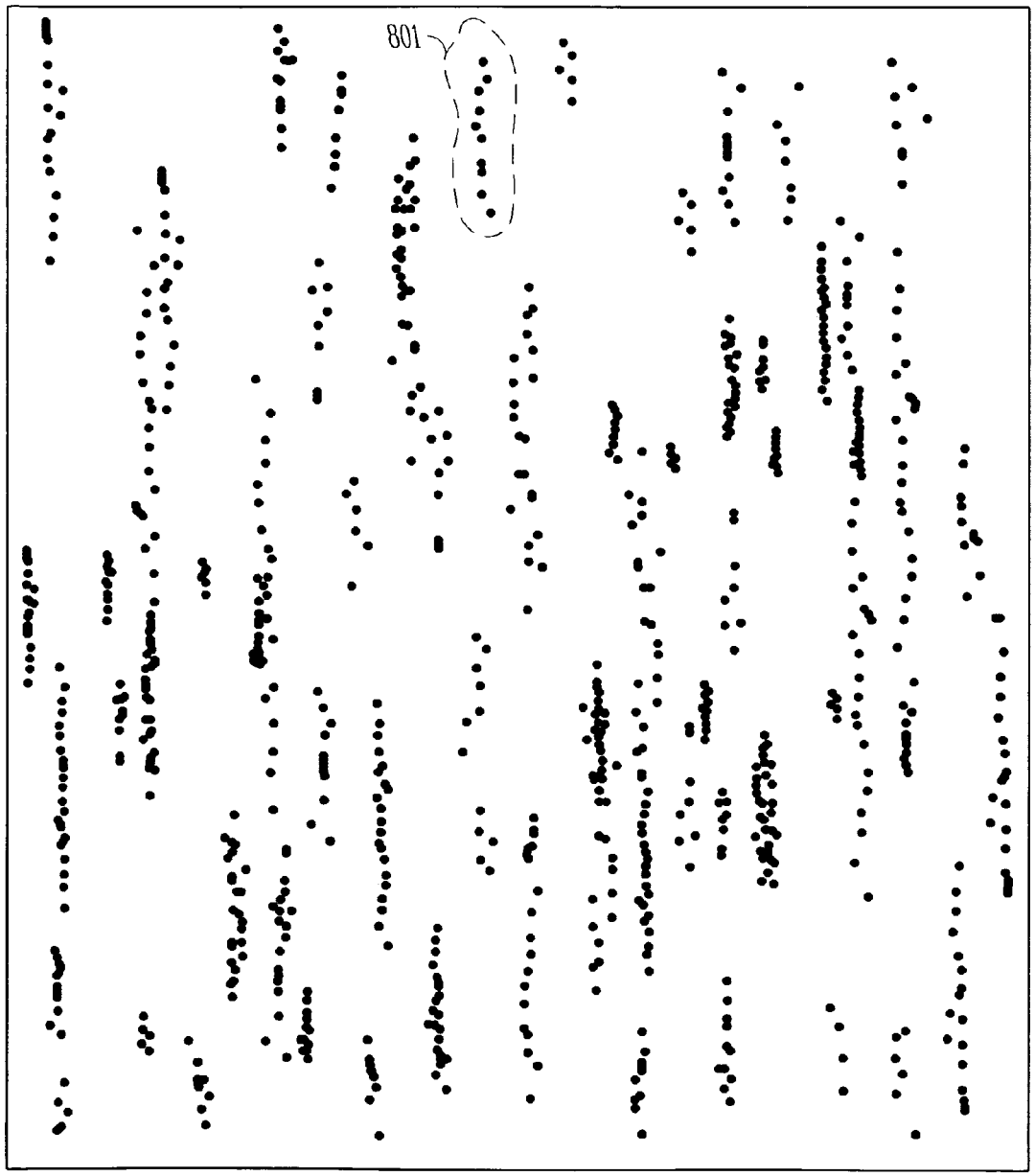
FIG. 8 is a diagram of an example adjacency matrix that may appear in a GUI, according to an example embodiment, reflecting a plurality of sending accounts related to a particular receiving account.

FIG. 8 is a diagram of an example visual representation of an adjacency matrix that may appear in, for example, a GUI 114 reflecting a plurality of sending accounts related to a particular receiving account. Shown is a grouping 801 of a plurality of transaction data sent from a plurality of sending accounts to one receiver account. As reflected in grouping 801, these various convergence points contained within this grouping are oriented in a vertical manner such that they are related to a particular receiving account residing on the X-axis of the adjacency matrix. This type of grouping 801 may result as the product of a sorting algorithm applied to the various requested transaction data 111 used to generate this adjacency matrix or may be the result of a random distribution of data. Further, as discussed elsewhere, the convergence points reflected in the grouping 801 are more granular compared to, for example, the convergence points as reflected in for example FIGS. 3 and 4.

Figure 9:
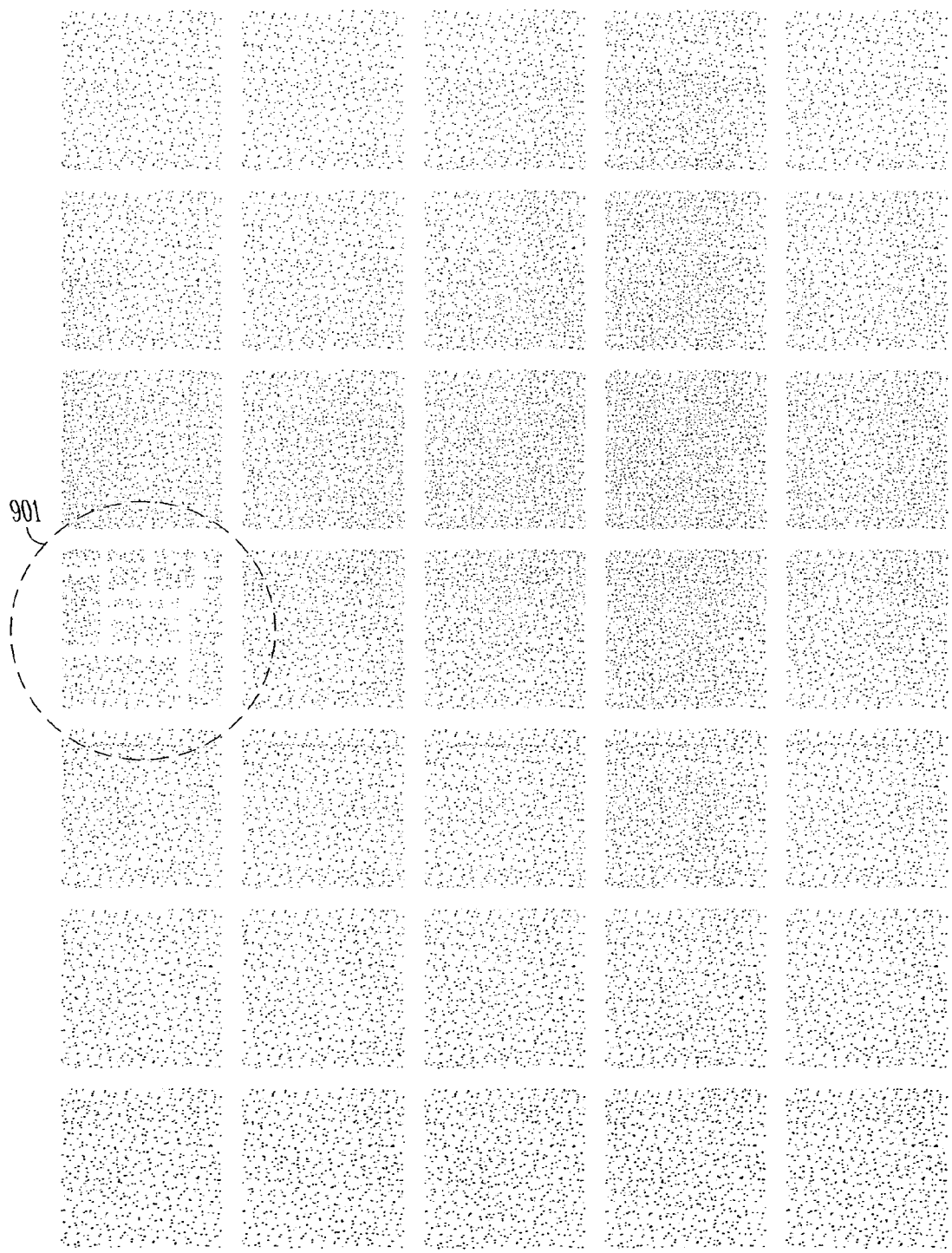
FIG. 9 is a diagram of an adjacency matrix as it may appear in a GUI, according to an example embodiment, wherein this adjacency reflects a sorted micro-segment.

FIG. 9 is a diagram of an example visual representation of an adjacency matrix as it may appear in, for example, a GUI 114 wherein this adjacency reflects a sorted micro-segment. In some example embodiments, a sorted micro-segment may be displayed within the GUI 114 as a part of the adjacency matrix. In one example embodiment, this sorted micro-segment may be various convergence points existing within the adjacency matrix that are sorted such that a quadrant or a portion of the adjacency matrix is sorted based upon information relating to an account type, the geography of a particular account, the country of n particular account, and/or a particular physical location of the account holder. In some example embodiments, some other suitable type of information may be used to sort this quadrant or portion of the adjacency matrix. For example, as shown in FIG. 9, a quadrant 901 reflects various micro-segments of a larger segment quadrant or portion of the adjacency matrix that has been sorted. This sorting may be done using one of the sorting algorithms mentioned elsewhere and may be performed iteratively or recursively such that the convergence points may be sorted using the sorting algorithm.

In some example embodiments, the example adjacency matrices of FIGS. 3 through 9 may be represented as in three dimensions including an X, Y, and Z axis. As shown above, the X and Y axes of this three-dimensional adjacency matrix may relate to accounts in the form of sending accounts and receiving accounts. In addition to these X and Y axes, a Z axis may be added to reflect changes over time relating to the sending and receiving accounts and the X and Y axes and their plurality of convergence points (e.g., representing transaction data). In some example embodiments, the addition of the Z axis would have the effect of providing a topology for the plurality of convergence points. This topology may, for example, allow for the plurality of convergence points to be compared to one another over time so as to provide a context for understand the X and Y axes.

Some example embodiments may include the use of a database technology including OLAP to provide a basis for analyzing data over time and for generating a three-dimensional adjacency matrix. In such an embodiment, sending accounts and receiving accounts, and the transaction data associated with these accounts, may be stored in a multidimensional cube and retrieved using a Multidimensional Expression (MDX) language. Once retrieved, this data could be passed to method 1000 outlined below for rendering of the data in a GUI.

Some example embodiments may include, the use of a recursive or iterative operation to show data displayed in the X, Y, or Z axes of an adjacency matrix (see e.g., FIGS. 3 through 9) over a change in time. For example, in one embodiment, a beginning and ending point of time is selected as is the transaction data associated with the period between the beginning and ending point. The beginning and ending point of time may define a block of time. Next, various iterative or recursive steps are selected so as to segment the block of time. A recursive or iterative operation is then executed so as to display the changes in the selected transaction data over each recursive or iterative step. The result of the execution of this recursive or iterative step is an animation effect showing a change of the transaction data over time.

Example Logic

Figure 10:
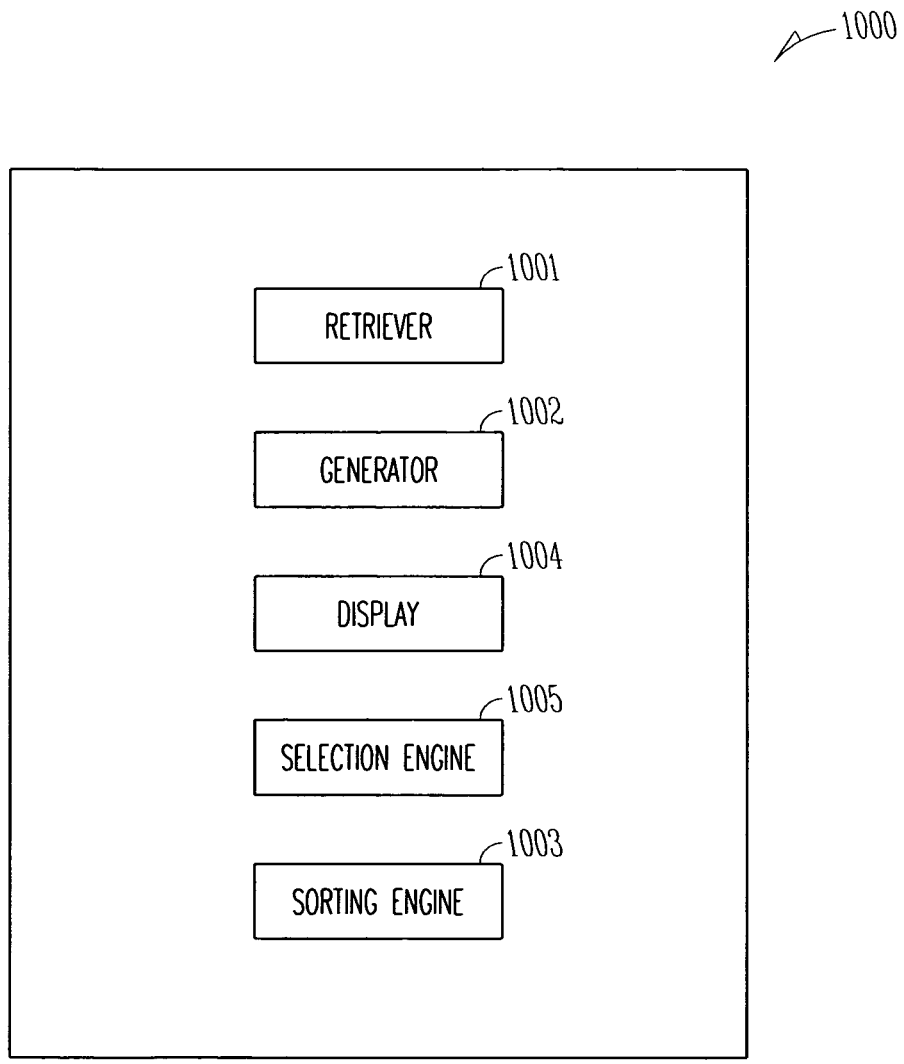
FIG. 10 is a block diagram of a computer system, according to an example embodiment, used to generate a sorted adjacency matrix and/or to micro-sort a portion of the adjacency matrix.

FIG. 10 is a block diagram of an example computer system 1000. In some example embodiments, this computer system 1000 may be a parallel computing cluster 110, a data base server 107, or a pattern recognition computer 201. The various blocks shown herein may be implemented in hardware, firmware, or software. Shown is a retriever 1001 to retrieve account data including at least one of an account identifier and transaction data. A generator 1002 is also shown to generate a data structure including the account data. Further, a sorting engine 1003 is shown to sort the data structure including the account data to create a sorted account data structure. A display 1004 may also be implemented to display the sorted account data structure. In some example embodiments, the account identifier includes at least one of a numeric value, or a network handle. Some example embodiments may include transaction data that includes at least one of sale data, purchase data, IP address data, or geographic location data. Additionally, in some example embodiments, the data structure includes a multi-dimensional array represented as a matrix. Moreover, the sorted account data structure may include a plurality of sorted account identifiers. Further, the sorted account data structure may include a plurality of sorted transaction data. The sorting may also include includes sorting the data structure based upon at least one of a first type of account identifier, or a first type of transaction data. A selection engine 1005 may also be implemented to select an area of the sorted account data structure to form a micro segment. Another engine (not pictured) may also be implemented to sort the micro segment to generate a sorted micro segment. This sorting engine may reside as part of the sorting engine 1003. Further, this sorting engine may sort the micro segment based upon at least one of a second type of account identifier, or a second type of transaction data.

Figure 11:
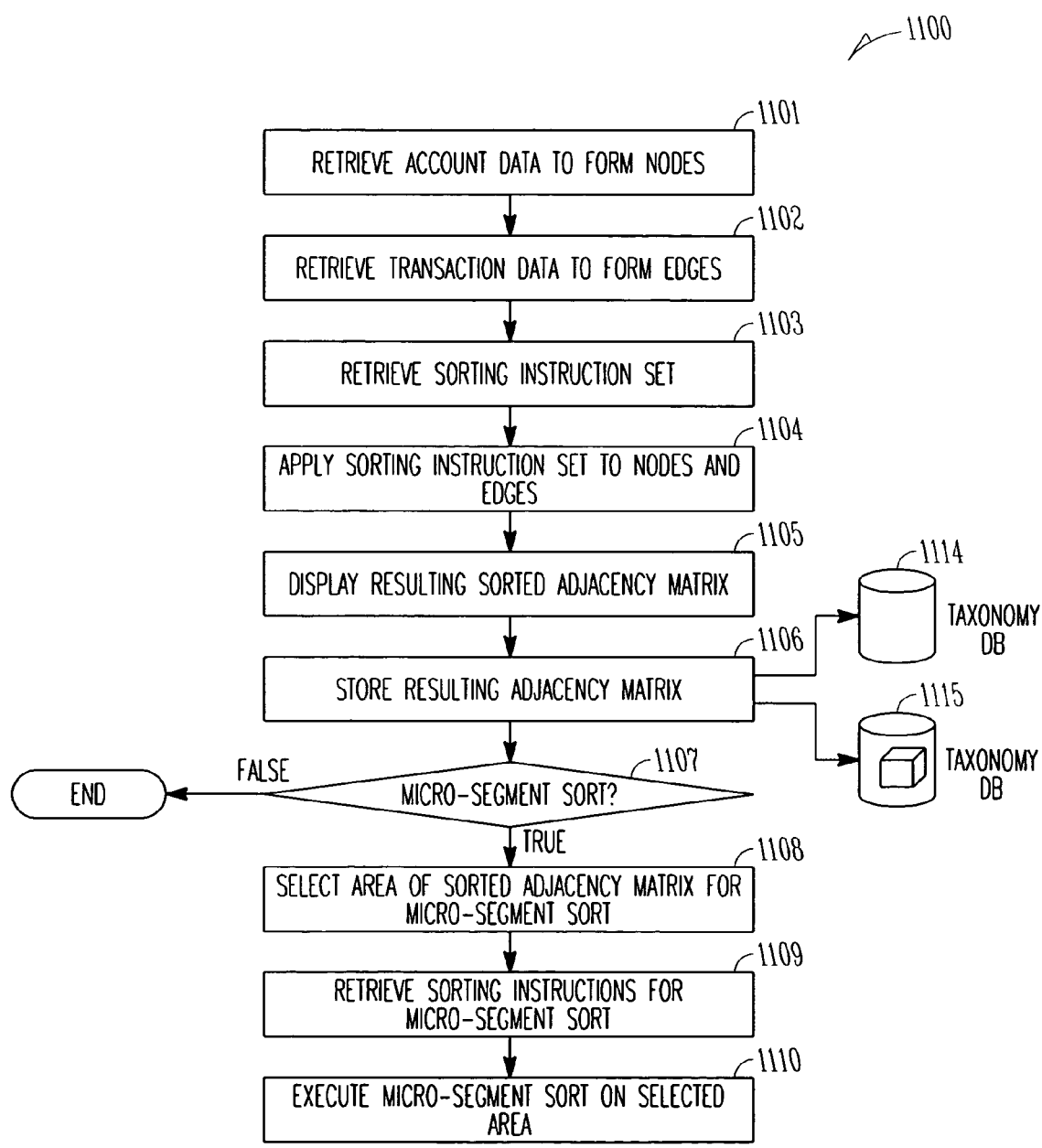
FIG. 11 is a flowchart illustrating a method, according to an example embodiment, used to sort an adjacency matrix and/or to micro-sort a portion of the adjacency matrix.

FIG. 11 is a flowchart illustrating an example method 1100 used to sort an adjacency matrix and/or to micro-sort a portion of an adjacency matrix. Shown is an operation 1101 that receives account data to form nodes. In particular, when operation 1101 is executed, the requested transaction data 111 is retrieved from the database server 107 and provided to the parallel computing cluster 110. In some example embodiments, the operation 1001 retrieves the requested transaction data 111 in real time, as opposed to from a data store or database. As a result of computations performed by the parallel computing cluster 110, this account data may be displayed and sorted. Further, in some example embodiments, an operation 1102 is executed that retrieves transaction data to form edges (e.g., convergence points). In some example embodiments, requested transaction data 111 retrieved from the database server 107 is processed by a parallel computing cluster 110 so as to form edges. In one example embodiment, the edges are used to form convergence points within the adjacency matrix where the account data is used to form the accounts creating the X and Y axes of the adjacency matrix.

In some example embodiments, an operation 1103 is executed that retrieves a sorting instruction set. The sorting instruction set may be retrieved from, for example, a pattern recognition computer 201. This pattern recognition computer 201 may receive these sorting instructions from, for example, the system administrator or the suitable person. The sorting instructions may be encoded using, for example, an eXtensible Markup Language (XML), a file utilizing some type of character delimited instructions, or some other suitable type of format. An operation 1104 may be executed that applies the sorting instruction set to the nodes and edges such that the nodes and edges used to generate the convergence points in the X and Y axes of the adjacency matrix are sorted. Further, in some example embodiments, an operation 1105 is executed that displays a resulting sorted adjacency matrix within the GUI 114. An operation 1106 may be executed that stores resulting adjacency matrix into, for example, a taxonomy database 1114 or a taxonomy database 1115. This taxonomy database 1114 corresponds to the relational database 108 whereas the taxonomy database 1115 corresponds to the OLAP database 109. A decisional operation 1107 may be executed that determines whether or not a micro-segment sort has been requested. In cases where decisional operation 1107 evaluates to "false," the termination condition is met. In cases where decisional operation 1107 evaluates to "true," a further operation 1108 is executed.

With regard to operation 1108, when executed, this operation allows a user 113 to select an area of the sorted adjacency matrix for a micro-segment sort. This selection process may be facilitated through the use of some type of Input/Output (I/O) device such as a mouse, keyboard, light pen, or other suitable device. Once this area is selected, a micro-segment sort may be initiated. As described elsewhere, this area may be, for example, the area 901 previously referenced in FIG. 9. In some example embodiments, the sorting utilized for the micro-segment sort may be based upon one or more sorting algorithms retrieved from, for example, a sorting algorithm data store 202. This sorting algorithm, as previously described, may be sorting algorithms manifesting a worse case computation complexity time of $\Theta(n\log n)$, and/or $\Theta(n^2)$. An operation 1109 may be executed that may retrieve sorting instructions for the micro-segment sort. These sorting instructions may be retrieved from, for example, the pattern recognition computer 201. These micro-segment sorting instructions may be provided by, for example, a system administrator utilizing, for example, an XML formatted file or a character delimited file. An operation 1110 may then be executed that acts to apply the sorting algorithm to a particular area so as to generate a micro-segment sort of the selected area. The selected area may be, for example, the area 901 previously referenced.

In some example embodiments, the operation 1101, when executed, may retrieve account data including at least one of an account identifier and transaction data. The operation 1104, when executed, may generate a data structure including the account data. Further, the operation 1104 may also sort the data structure including the account data to create a sorted account data structure. An operation 1105 when executed may display the sorted account data structure. In some example embodiments, the account identifier includes at least one of a numeric value, or a network handle. The transaction data may include at least one of sale data, purchase data, IP address data, or geographic location data. Further, the data structure may include a multi-dimensional array represented as a matrix. The sorted account data structure may include a plurality of sorted account identifiers. Further, the sorted account data structure may include a plurality of sorted transaction data. The operation 1104, when executed, may also sort the data structure based upon at least one of a first type of account identifier, or a first type of transaction data. An operation 1108, when executed, may select an area of the sorted account data structure to form a micro segment. An operation 1110 when executed may sort the micro segment to generate a sorted micro segment. This operation 1110, when executed, may also sort the micro segment based upon at least one of a second type of account identifier, or a second type of transaction data.

Figure 12:
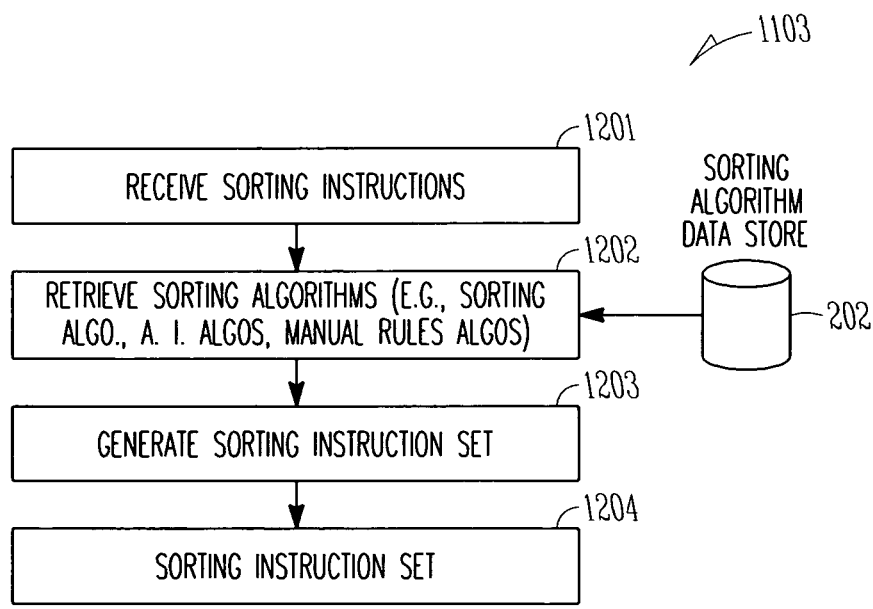
FIG. 12 is a flowchart illustrating a method, according to an example embodiment, used to execute an operation that retrieves a sorting instruction set.

FIG. 12 is a flowchart illustrating an example method used to execute operation 1203. Illustrated is an operation 1201 that receives sorting instructions when executed. An operation 1202 is executed that retrieves the sorting algorithm from, for example, a sorting algorithm data store 202. An operation 1203 may be executed that generates a sorting instruction set in the form of sorting instruction set 1204.

Figure 13:
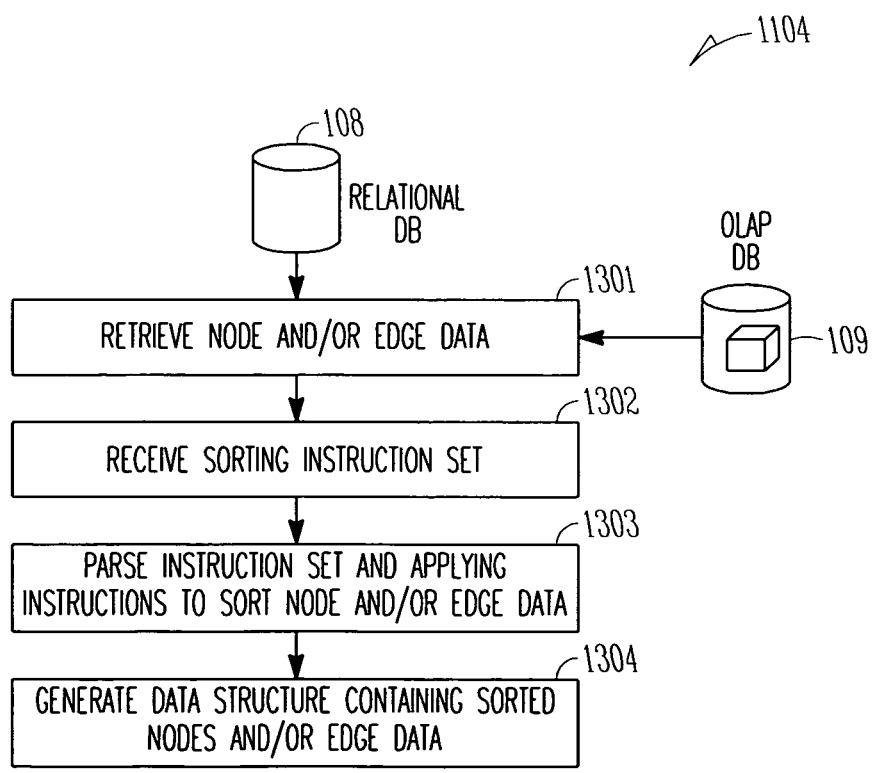
FIG. 13 is a flowchart illustrating a method, according to an example embodiment, used to execute an operation that applies the sorting instruction set to the nodes and edges such that the nodes and edges are used to generate the convergence points within an adjacency matrix.

FIG. 13 is a flowchart illustrating an example method used to execute operation 1104. Illustrated is an operation 1301 that retrieves node and/or edge data from, for example, the relational database 108 or the OLAP database 109. Once retrieved, an operation 1302 is executed that receives the sorting instruction set, such as sorting instruction set 1104. An operation 1303 is executed that parses the sorting instruction set and applies the instructions taken from the parsed sorting instruction set to be used to sort a node and/or edge data. In some example embodiments, the operation 1303 acts as a sorting engine retrieving node and/or edge data and sorting this data using the sorting algorithm as reflected in the parsed sorting instruction set. An operation 1304 may be executed that generates a data structure containing the sorted nodes and/or edge data when this data structure may be, for example, a single or multi-dimensional adjacency matrix, hash table, a tree, a binary search tree, or some other suitable data structure.

Figure 14:
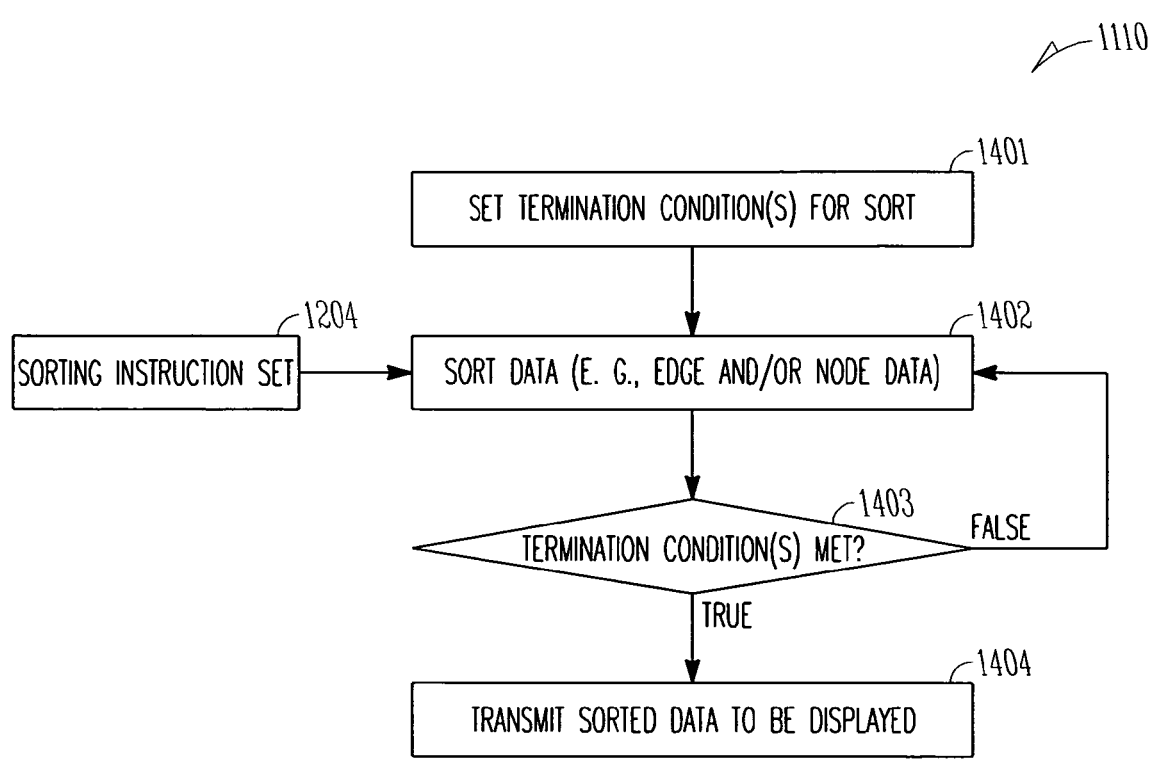
FIG. 14 is a flowchart illustrating a method, according to an example embodiment, used to execute an operation that sets the termination condition for a sort.

FIG. 14 is a flowchart illustrating an example method used to execute operation 1110 shown as an operation 1401 that sets the termination condition for a sort. This setting of a termination condition may be dictated by, for example, a system administrator or other suitable person such as, for example, the user 113. An operation 1402 is executed that retrieves the sorting instruction set 1204 to be used to sort edge and/or node data, wherein the nodes correspond to sending and receiving accounts and the edges correspond to convergence points such as, for example, transactions between the sending and receiving accounts. In some example embodiments, a decisional operation 1403 is executed that determines whether or not a termination condition has been met for the sort. In cases where decisional operation 1403 evaluates to "false," the operation 1402 is re-executed. In cases where decisional operation 1403 evaluates to "true," an operation 1404 is executed. This operation 1404 acts to transmit sorted data to be displayed within the GUI 114. In some example embodiments, this operation 1010 may be used in lieu of operation 1203 to sort node and/or edge data.

In some example embodiments, the various operations 1101 through 1110 may reside as a part of, for example, the parallel computing cluster 110, or other suitable computer system referenced above. In other example embodiments, these various operations 1101 through 1110 may reside as a part of the pattern recognition computer 201. Further, in some example embodiments, these various operations 1101 through 1110 may be divided amongst the parallel computing cluster 110 and the pattern recognition computer 201.

Figure 15:
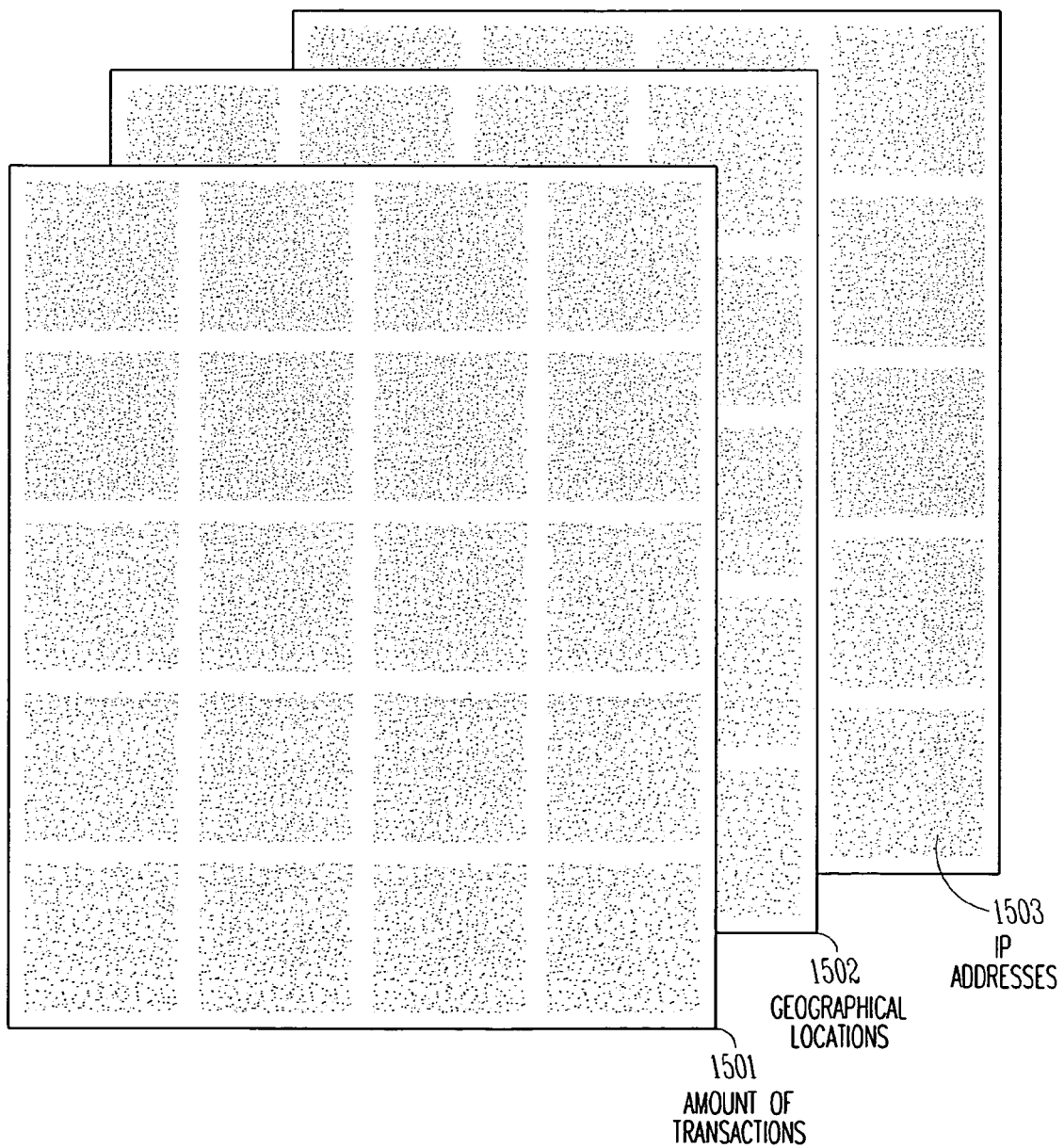
FIG. 15 is a diagram of a data structure, according to an example embodiment, displaying a plurality of adjacency matrices shown as a data structure.

FIG. 15 is a diagram of an example data structure displaying a plurality of adjacency matrices shown as a data structure 1500. In some example embodiments, this plurality of adjacency matrices may be a multi-dimensional array, wherein each sub-array of the multi-dimensional array corresponds to a particular type of convergence point between a sending and receiving account. For example, a first sub-array 1501 references the amount of transactions (e.g., convergence points relating to amount of transactions) between a sending and receiving account. Further, a second sub-array 1502 describes the convergence of geographical locations (e.g., convergence points relating to geographical locations) between a sending and receiving account. Moreover, a third sub-array 1503 describes a convergence of various IP addresses (e.g., convergence points relating to IP addresses) common between various sending and receiving accounts.

In some example embodiments, the data structure 1500 may be implemented to compare multiple points of convergence at once for a set of accounts (e.g., receiving accounts). This data structure 1500 may allow a user 113 to see the observe the similarities and differences between accounts across multiple sets of data in the form of convergence points.

Figure 16:
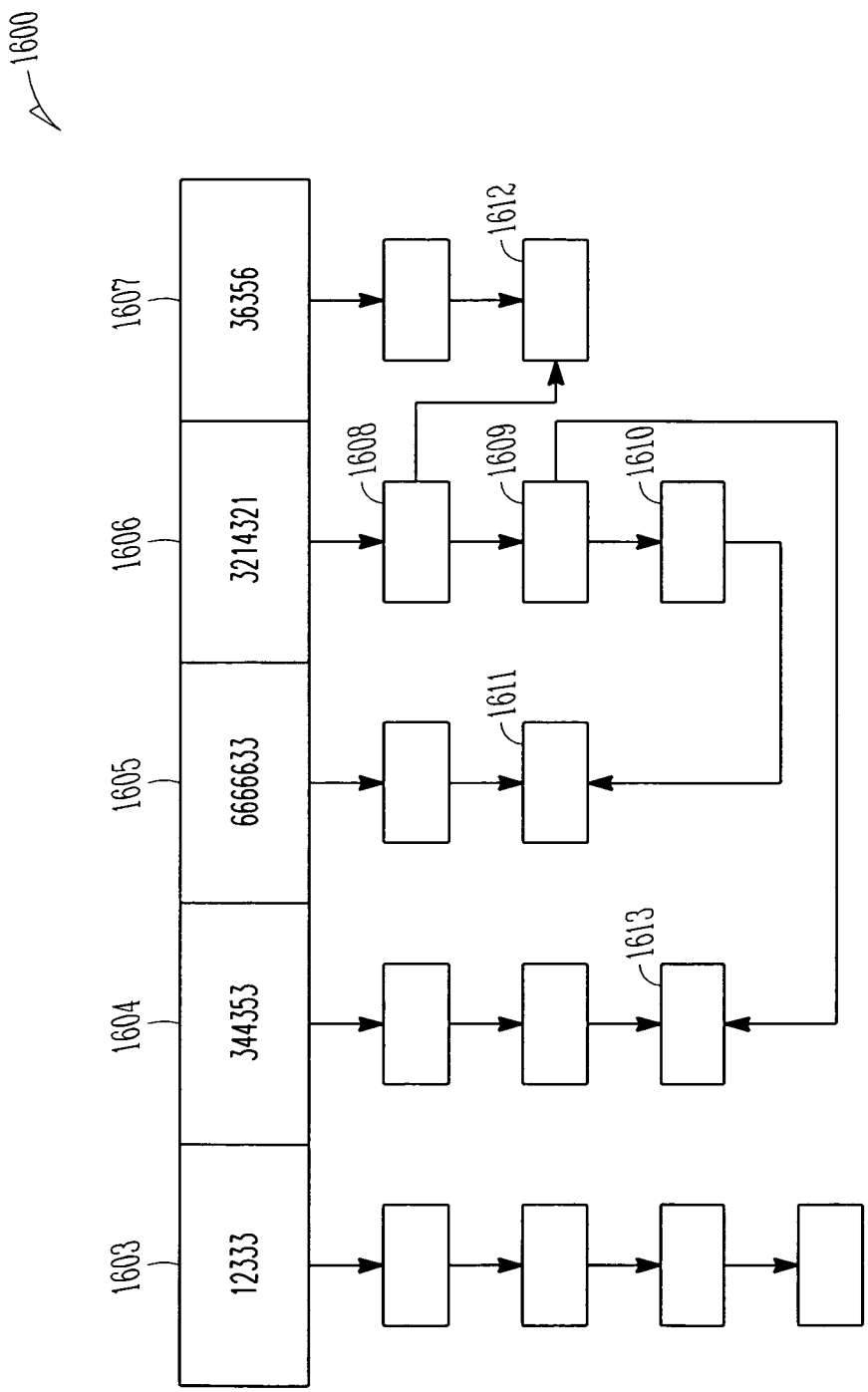
FIG. 16 is a diagram of a hash table, according to an example embodiment, illustrating the relationship between various accounts.

FIG. 16 is a diagram of an example hash table 1600 illustrating the relationship between various accounts. Illustrated is a hash table 1600 utilizing bucket hashing. In some example embodiments, bucket hashing may be utilized to store and relate sending and receiving account data, whereas, in other example embodiments, cluster hashing may be utilized. As illustrated here, a hash table 1600 is described wherein at each index value for the hash table an account number is shown. For example, an index 1603 contains an account number 12333. The index 1604 contains an account number 344353. An index 1605 contains an account number 6666633. An index 1606 contains an account value 321431. An index 1607 contains an account value 36356. Linked to each one of these indexes is a plurality of nodes wherein each one of these nodes represents attributes of a particular account. These attributes may include, for example, a daily transaction amount, an IP address value, a geographical location description, an amount of transaction value, or some other suitable value describing data relating to a particular account. These attributes maybe used to form edges between accounts. Accompanying each one of these values, in some example embodiments, is a link to another value and more particularly to an account associated with that value. For example, a node 1608 associated with the account at index 1606 is linked to a node 1612 associated with index 1607. Further, a node 1609 is associated to a node 1613 which in turn is associated with an account at index 1604. Moreover, a node 1610 associated with the account at index 1606 is associated with a node 1611 associated with an account at index 1605. In some example embodiments, some other suitable data structure such as, for example, a tree, may be utilized to allow for the accessing of data associated with a particular sending and a receiving account.

Example Storage

Some embodiments may include the various databases (e.g., 108 and 109) being relational databases, or in some cases OLAP based databases. In the case of relational databases, various tables of data are created and data is inserted into, and/or selected from, these tables using SQL, or some other database-query language known in the art. In the case of OLAP databases, one or more multi-dimensional cubes or hypercubes containing multidimensional data from which data is selected from or inserted into using MDX may be implemented. In the case of a database using tables and SQL, a database application such as, for example, MYSQL™, SQLSERVER™, Oracle 81™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 17:
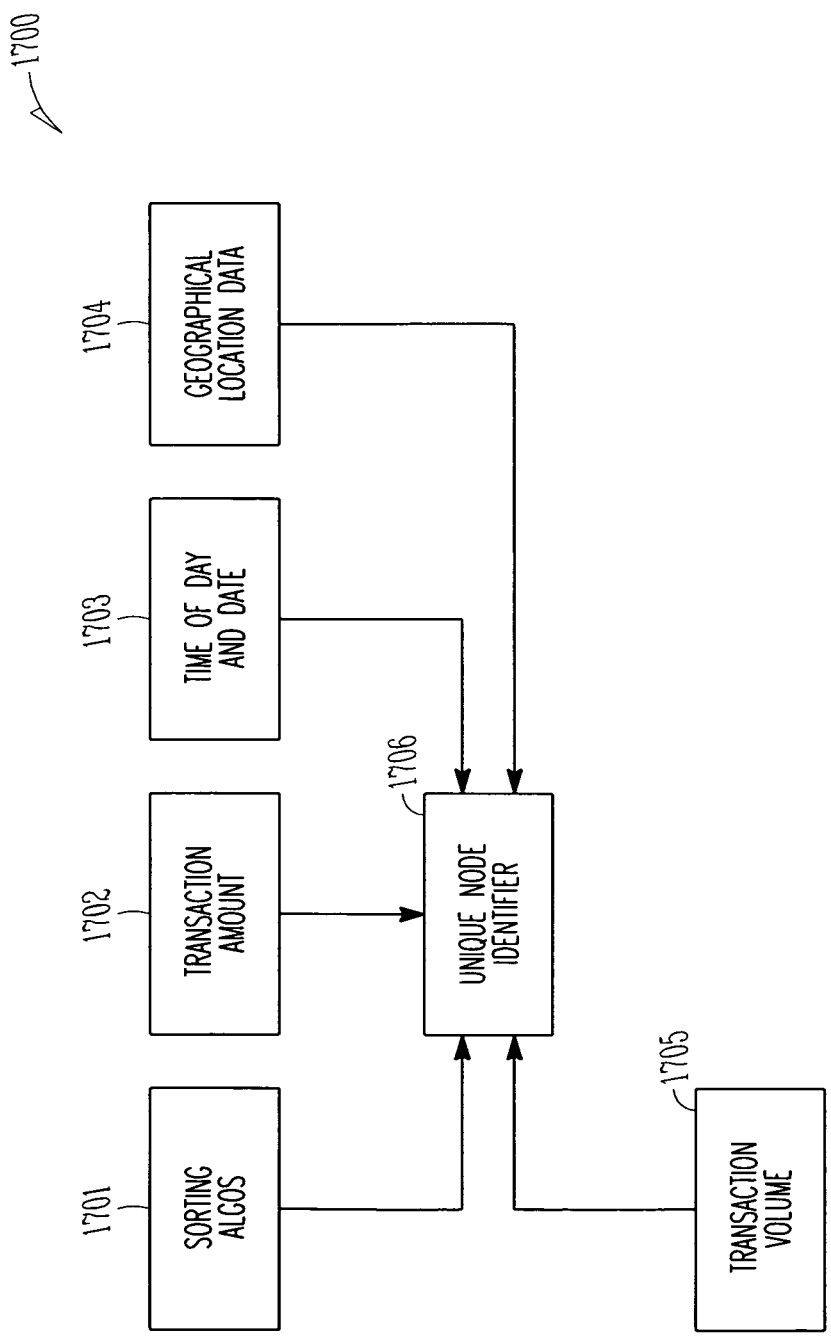
FIG. 17 is a Relational Data Schema (RDS), according to an example embodiment, illustrating various data tables associated with one embodiment of the present system and method.

FIG. 17 is an RDS 1700 illustrating various data tables associated with one embodiment of the present system method shown as a table 1701 containing sorting algorithms. These sorting algorithms may be sorting algorithms including algorithms capable of a worst case computation complexity of $\Theta(n\log n)$. In some example embodiments, these sorting algorithms may be stored as, for example, a Binary Large Object (BLOB), index and all formatted file or some other suitable format. A table 1702 is also shown containing transaction amount data. This transaction amount data may be, for example, formatted using, for example, an integer, float, double, currency, or some other suitable data type. Also shown is a Table 1703 containing time of day and date information pertaining to a particular transaction. This time of day and date information may be formatted using, for example, a date data type, string data type, or some other suitable data type. A table 1704 is also shown containing geographical location data where this geographical location data may be, for example, a longitude and/or latitude descriptor, Global Positioning System (GPS) descriptor, or some other suitable descriptor format using, for example, a string, XML, or other suitable data type. A table 1705 is also shown containing transaction volume information where this transaction volume information may be, for example, an integer, float, double, or some other suitable numeric data type used to describe the volume relating to particular transaction between a sending and receiving account. Table 1706 is also shown that contains unique node identifier information used to uniquely identify various nodes associated with or a particular node associated with data contained in any one of the tables 1701 through 1705.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage, tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an Internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

Figure 18:
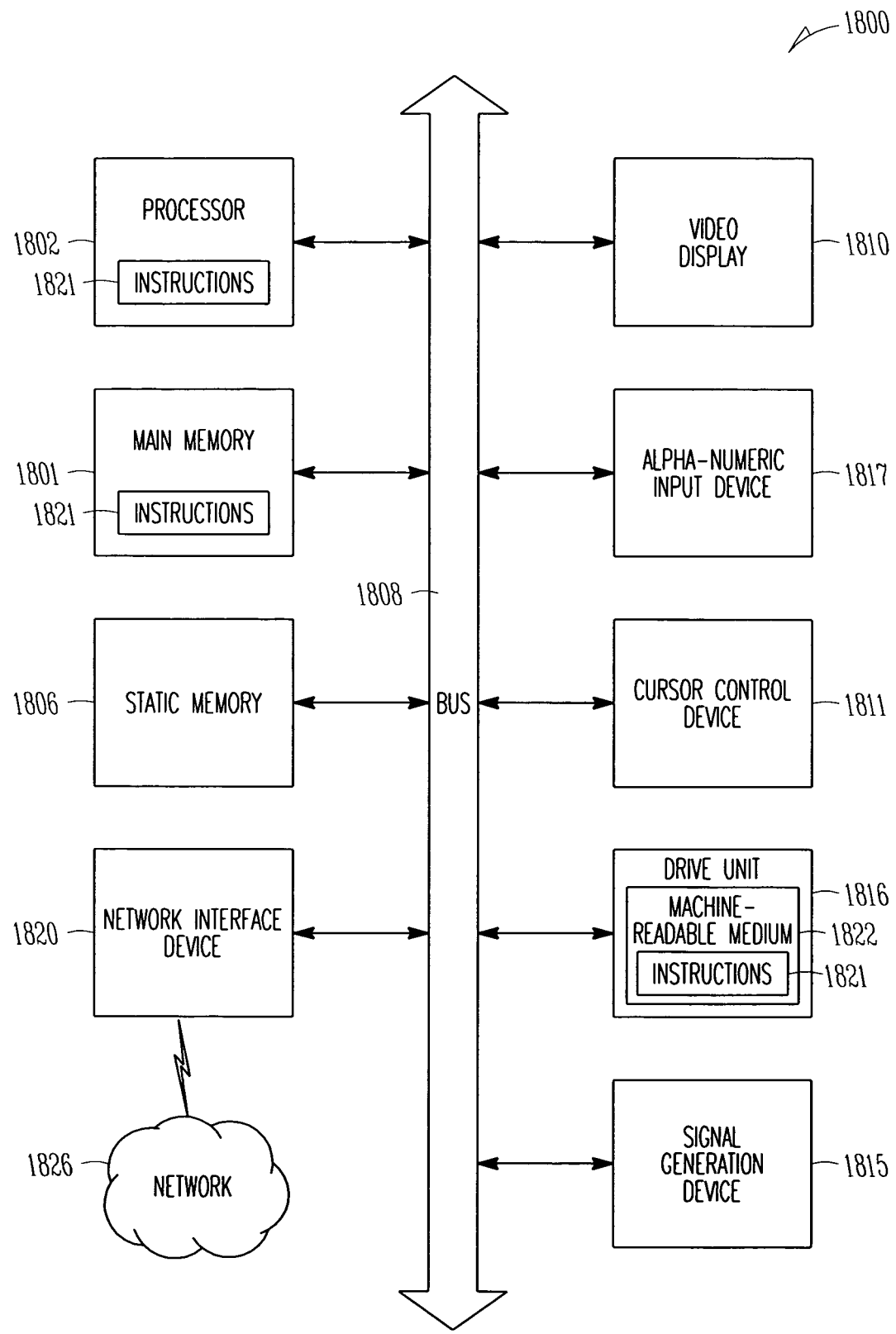
FIG. 18 shows a diagrammatic representation of a machine in the example form of a computer system, according to an example embodiment.

FIG. 18 shows a diagrammatic representation of a machine in the example form of a computer system 1800 that executes a set of instructions to perform any one or more of the methodologies discussed herein. One of the devices 102 may configured as a computer system 1800. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a High-performance computing (HPC) cluster, a vector based computer, a Beowulf cluster, or some type of suitable parallel computing cluster. In some example embodiments, the machine may be a personal computer (PC). Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1800 includes a processor 1802 (e.g., a Central Processing Unit (CPU), a Graphics Processing Unit (GPU) or both), a main memory 1801, and a static memory 1806, which communicate with each other via a bus 1808. The computer system 1800 may further include a video display unit 1810 (e.g., a Liquid Crystal Display (LCD) or a Cathode Ray Tube (CRT)). The computer system 1800 may also includes an alphanumeric input device 1817 (e.g., a keyboard), a GUI cursor controller 1811 (e.g., a mouse), a disk drive unit 1816, a signal generation device 1815 (e.g., a speaker) and a network interface device (e.g., a transmitter) 1820.

The disk drive unit 1816 includes a machine-readable medium 1822 on which is stored one or more sets of instructions 1821 and data structures (e.g., software) embodying or used by any one or more of the methodologies or functions illustrated herein. The software may also reside, completely or at least partially, within the main memory 1801 and/or within the processor 1802 during execution thereof by the computer system 1800, the main memory 1801 and the processor 1802 also constituting machine-readable media.

The instructions 1821 may further be transmitted or received over a network 1826 via the network interface device 1820 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, a system and method is shown that facilitates the visual representation of large amounts of transaction data. This transaction data, in some example embodiments, relates to on line transactions involving goods and services between persons in a network. In some example embodiments, the amount of data may include data in the terabyte range. Some example embodiments may include the generation of an adjacency matrix wherein the axes are composed of accounts and the coordinates within the matrix are composed of transaction information relating to accounts. This adjacency matrix may be converted into a graph in some cases, where the accounts are nodes and the transactions are edges.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   receiving a selection of a beginning and ending point of time, transaction data associated with a period of time between the beginning and ending point of time, and a recursive operation to segment the period of time;
   retrieving account data including at least one account identifier and the transaction data for the at least one account identifier for the period of time;
   generating, using one or more hardware processors, a three-dimensional matrix having
      a first axis representing accounts held by sellers in transactions in a networked marketplace of sellers and purchasers,
      a second axis representing accounts held by purchasers in the transactions in the networked marketplace of sellers and purchasers,
      a plurality of convergence points each representing a transactional relationship between the accounts corresponding to each of convergence points, and
      a third axis that provides a topology for the plurality of convergence points by reflecting changes over time relating to the accounts held by the sellers and the purchasers and the plurality of convergence points based on the account data;
   retrieving sorting instructions from a database of a plurality of sorting instructions to sort the generated matrix according to a characteristic of the transactions;
   sorting the generated matrix including the account data to create a sorted matrix based on the retrieved sorting instructions, the sorted matrix indicating a transaction trend within the networked marketplace of sellers and purchasers;
   determining a pattern that indicates the transaction trend within the networked marketplace of sellers and purchasers by analyzing the sorted matrix; and
   executing the recursive operation, the executing causing a display of changes of the transaction data over the period of time resulting in an animation effect showing the changes of the transaction data over the period of time.

2. The computer implemented method of claim 1, wherein the account identifier includes at least one of a numeric value or a network handle.

3. The computer implemented method of claim 1, wherein the transaction data include at least one of sale data, purchase data, IP address data, or geographic location data.

4. The computer implemented method of claim 1, further comprising:
   generating a plurality of matrices using the account data; and
   combining the plurality of matrices to create a multi-dimensional array, whereby each sub-array of the multi-dimensional array corresponds to a particular type of convergence point between the accounts.

5. The computer implemented method of claim 1, wherein the sorted matrix includes a plurality of sorted account identifiers.

6. The computer implemented method of claim 1, wherein the sorted matrix includes a plurality of sorted transaction data.

7. The computer implemented method of claim 1, further comprising sorting the matrix based upon at least one of a first type of account identifier or a first type of transaction data.

8. The computer implemented method of claim 7, further comprising:

receiving a selection of an area of the sorted matrix defining a micro segment, the micro segment being a subdivision of the sorted matrix; and sorting the micro segment to generate a sorted micro segment.

9. The computer implemented method of claim 8, further comprising sorting the micro segment based upon at least one of a second type of account identifier or a second type of transaction data.

10. The computer implemented method of claim 1, wherein the retrieved sorting instructions comprise one of a merge sort algorithm, a quick sort algorithm, bubble sort algorithm, or a selection sort algorithm.

11. The computer implemented method of claim 1, wherein the retrieved sorting instructions are retrieved using a pattern recognition computer.

12. The computer implemented method of claim 1, further comprising identifying patterns within the sorted matrix using an automated inspection regime.

13. The computer implemented method of claim 1, wherein the generated matrix is an adjacency matrix generated from the transaction data and the sorted matrix is the generated adjacency matrix sorted using the retrieved sorting instructions.

14. The computer implemented method of claim 1, wherein the transaction trend indicated by the pattern comprises an existence of on-going fraud within the networked marketplace.

15. The computer implemented method of claim 1, wherein the transaction trend indicated by the pattern comprises buying habits of at least some of the purchasers within the networked marketplace.

16. A computer system comprising:
a hardware processor of a machine;
a retriever to retrieve account data including at least one account identifier and transaction data for the at least one account identifier based on a selection of a beginning and ending point of time, the transaction data associated with a period of time between the beginning and ending point of time, and a recursive operation to segment the period of time;
a generator to generate, using the hardware processor of the machine, a three-dimensional matrix having
    a first axis representing accounts held by sellers in transactions in a networked marketplace of sellers and purchasers,
    a second axis representing accounts held by purchasers in the transactions in the networked marketplace of sellers and purchasers,
    a plurality of convergence points each representing a transactional relationship between the accounts corresponding to each of convergence points, and
    a third axis that provides a topology for the plurality of convergence points by reflecting changes over time relating to the accounts held by the sellers and the purchasers and the plurality of convergence points based on the account data;
a sorting engine to sort the generated matrix including the account data to create a sorted matrix based on retrieved sorting instructions from a database of a plurality of sorting instructions, the sorted matrix indicating a transaction trend within the networked marketplace of sellers and purchasers;
an automated inspection component to determine a pattern that indicates the transaction trend within the networked marketplace of sellers and purchasers by analyzing the sorted matrix; and a display to display changes of the transaction data over the period of time based on execution of the recursive operation, the execution resulting in the display of changes as an animation effect showing the changes of the transaction over the period of time.

17. The computer system of claim 16, wherein the account identifier includes at least one of a numeric value or a network handle.

18. The computer system of claim 16, wherein the transaction data includes at least one of sale data, purchase data, IP address data, or geographic location data.

19. The computer system of claim 16, wherein the generator generates a plurality of matrices and creates a multi-dimensional array from the plurality of matrices, whereby each sub-array of the multi-dimensional array corresponds to a particular type of convergence point between the accounts.

20. The computer system of claim 16, wherein the sorted matrix includes a plurality of sorted account identifiers.

21. The computer system of claim 16, wherein the sorted matrix includes a plurality of sorted transaction data.

22. The computer system of claim 16, wherein the sorting includes sorting the matrix based upon at least one of a first type of account identifier or a first type of transaction data.

23. The computer system of claim 22, further comprising:
a selection engine to receive a selection of an area of the sorted matrix to form a micro segment, the micro segment being a subdivision of the sorted matrix; and
the sorting engine to sort the micro segment to generate a sorted micro segment.

24. The computer system of claim 23, wherein the sorting engine sorts the micro segment based upon at least one of a second type of account identifier or a second type of transaction data.

25. An apparatus comprising:
means for receiving a selection of a beginning and ending point of time, transaction data associated with a period of time between the beginning and ending point of time, and a recursive operation to segment the period of time;
means for retrieving account data including at least one account identifier and the transaction data for the at least one account identifier for the period of time;
means for generating, a three-dimensional matrix having
    a first axis representing accounts held by sellers in transactions in a networked marketplace of sellers and purchasers,
    a second axis representing accounts held by purchasers in the transactions in the networked marketplace of sellers and purchasers,
    a plurality of convergence points each representing a transactional relationship between the accounts corresponding to each of convergence points, and
    a third axis that provides a topology for the plurality of convergence points by reflecting changes over time relating to the accounts held by the sellers and the purchasers and the plurality of convergence points based on the account data;
means for retrieving sorting instructions from a database of a plurality of sorting instructions to sort the generated matrix according to a characteristic of the transactions;
means for sorting the generated matrix including the account data to create a sorted matrix based on the retrieved sorting instructions, the sorted matrix indicating a transaction trend within the networked marketplace of sellers and purchasers;
means for determining a pattern that indicates the transaction trend within the networked marketplace of sellers and purchasers by analyzing the sorted matrix; and means for executing the recursive operation, the executing causing a display of changes of the transaction data over the period of time resulting in an animation effect showing the changes of the transaction data over the period of time.

26. A tangible machine-readable storage device comprising instructions, which when implemented by one or more hardware processors of a machine, cause the machine to perform operations comprising:

receiving a selection of a beginning and ending point of time, transaction data associated with a period of time between the beginning and ending point of time, and a recursive operation to segment the period of time;

retrieving account data including at least one account identifier and the transaction data for the at least one account identifier for the period of time;

generating a three-dimensional matrix having
- a first axis representing accounts held by sellers in transactions in a networked marketplace of sellers and purchasers,
- a second axis representing accounts held by purchasers in the transactions in the networked marketplace of sellers and purchasers,
- a plurality of convergence points each representing a transactional relationship between the accounts corresponding to each of the convergence points, and
- a third axis that provides a topology for the plurality of convergence points by reflecting changes over time relating to the accounts held by the sellers and the purchasers and the plurality of convergence points based on the account data;

retrieving sorting instructions from a database of a plurality of sorting instructions to sort the generated matrix according to a characteristic of the transactions;

sorting the generated matrix including the account data to create a sorted matrix, the sorted matrix indicating a transaction trend within the networked marketplace of sellers and purchasers;

determining a pattern that indicates the transaction trend within the networked marketplace of sellers and purchasers by analyzing the sorted matrix; and executing the recursive operation, the executing causing a display of changes of the transaction data over the period of time resulting in an animation effect showing the changes of the transaction data over the period of time.

* * * * *

UNITED STATES PATENT AND TRADEMARK OFFICE
CERTIFICATE OF CORRECTION

| | | |
|---|---|---|
| PATENT NO. | : 8,775,475 B2 | Page 1 of 1 |
| APPLICATION NO. | : 12/005005 | |
| DATED | : July 8, 2014 | |
| INVENTOR(S) | : Patil et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this
Second Day of August, 2016

Michelle K. Lee
*Director of the United States Patent and Trademark Office*